(12) United States Patent
Isaacs et al.

(10) Patent No.: US 10,595,384 B2
(45) Date of Patent: Mar. 17, 2020

(54) REMOTE LIGHT CONTROL, CONFIGURATION, AND MONITORING

(71) Applicant: MILWAUKEE ELECTRIC TOOL CORPORATION, Brookfield, WI (US)

(72) Inventors: Jason Isaacs, Milwaukee, WI (US); Brandon L. Verbrugge, Brookfield, WI (US); Matthew J. Mergener, Mequon, WI (US); Burtrom L. Stampfl, Bristol, WI (US); Stephen Matson, Milwaukee, WI (US); Christian Coulis, Sussex, WI (US); Scott Schneider, Waukesha, WI (US); Josh Schermerhorn, Wauwatosa, WI (US); Thomas G. Simeone, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/545,616

(22) Filed: Aug. 20, 2019

(65) Prior Publication Data
US 2019/0373707 A1 Dec. 5, 2019

Related U.S. Application Data

(63) Continuation of application No. 16/377,804, filed on Apr. 8, 2019, now Pat. No. 10,433,405, which is a
(Continued)

(51) Int. Cl.
*H05B 37/02* (2006.01)
*B25F 5/02* (2006.01)
*B25F 5/00* (2006.01)

(52) U.S. Cl.
CPC ............ *H05B 37/0272* (2013.01); *B25F 5/00* (2013.01); *B25F 5/02* (2013.01); *H05B 37/0227* (2013.01); *H05B 37/0245* (2013.01)

(58) Field of Classification Search
CPC .. H05B 37/02; H05B 37/029; H05B 37/0227; H05B 37/0245; H05B 37/0272;
(Continued)

(56) References Cited

U.S. PATENT DOCUMENTS 3,882,305 A 5/1975 Johnstone
4,545,106 A 10/1985 Juengel
(Continued)

FOREIGN PATENT DOCUMENTS

CN 102970784 3/2013
EP 2733416 A1 5/2014
(Continued)

OTHER PUBLICATIONS

European Patent Office Search Report for Application No. 16861014.5 dated Apr. 25, 2019 (9 pages).
(Continued)

*Primary Examiner* — Haissa Philogene
(74) *Attorney, Agent, or Firm* — Michael Best & Friedrich LLP

(57) ABSTRACT

A system of light devices including a first light device and a second light device. The first light device having a first housing, a first light, a first transceiver, a first electronic processor. The second light having a second housing, a second light, a second transceiver, a second electronic processor. The first electronic processor is coupled to the first light and the first transceiver, and configured to control operation of the first light, and transmit, via the first transceiver a command to the second light device. The second electronic processor coupled to the second light and the second transceiver, and configured to receive, via the second transceiver, the command from the first light device, and change an operational parameter of the second light in response to the command from the first light device.

20 Claims, 22 Drawing Sheets

Related U.S. Application Data continuation of application No. 15/878,745, filed on Jan. 24, 2018, now Pat. No. 10,349,498, which is a continuation of application No. 15/338,308, filed on Oct. 28, 2016, now Pat. No. 9,900,967.

(60) Provisional application No. 62/248,856, filed on Oct. 30, 2015.

(58) Field of Classification Search
CPC . B25F 5/00; B25F 5/02; H04M 1/725; H04M 1/7253; H04M 1/72533; H01L 12/12; H01L 12/282; H01L 2012/2841; Y02B 20/48
See application file for complete search history.

(56) References Cited

U.S. PATENT DOCUMENTS

| | | |
|---|---|---|
| 4,680,862 A | 7/1987 | Wieland et al. |
| 4,685,050 A | 8/1987 | Polzer et al. |
| 4,854,786 A | 8/1989 | Alexander et al. |
| 5,188,188 A | 2/1993 | Mars |
| 5,277,261 A | 1/1994 | Sakoh |
| 5,315,501 A | 5/1994 | Whitehouse |
| 5,592,396 A | 1/1997 | Tambini et al. |
| 5,903,462 A | 5/1999 | Wagner et al. |
| 5,942,975 A | 8/1999 | Sorensen |
| 6,005,489 A | 12/1999 | Siegle et al. |
| 6,055,484 A | 4/2000 | Lysaght |
| 6,123,241 A | 9/2000 | Walter et al. |
| 6,157,313 A | 12/2000 | Emmermann |
| 6,161,629 A | 12/2000 | Hohmann et al. |
| 6,279,668 B1 | 8/2001 | Mercer |
| 6,349,266 B1 | 2/2002 | Lysaght et al. |
| 6,390,205 B2 | 5/2002 | Wallgren et al. |
| 6,405,598 B1 | 6/2002 | Bareggi |
| 6,424,799 B1 | 7/2002 | Gilmore |
| 6,431,425 B1 | 8/2002 | Moorman et al. |
| 6,469,615 B1 | 10/2002 | Kady et al. |
| 6,508,313 B1 | 1/2003 | Carney et al. |
| 6,520,270 B2 | 2/2003 | Wissmach et al. |
| 6,522,949 B1 | 2/2003 | Ikeda et al. |
| 6,547,014 B2 | 4/2003 | McCallops et al. |
| 6,598,684 B2 | 7/2003 | Watanabe |
| 6,668,212 B2 | 12/2003 | Colangelo, II et al. |
| 6,675,196 B1 | 1/2004 | Kronz |
| 6,768,994 B1 | 1/2004 | Howard et al. |
| 6,687,567 B2 | 2/2004 | Watanabe |
| 6,784,801 B2 | 8/2004 | Watanabe et al. |
| 6,836,614 B2 | 12/2004 | Gilmore |
| 6,848,516 B2 | 2/2005 | Giardino |
| 6,872,121 B2 | 3/2005 | Wiener et al. |
| 6,913,087 B1 | 7/2005 | Brotto et al. |
| 6,923,285 B1 | 8/2005 | Rossow et al. |
| 6,938,689 B2 | 9/2005 | Farrant et al. |
| 6,954,048 B2 | 10/2005 | Cho |
| 6,968,908 B2 | 11/2005 | Tokunaga et al. |
| 6,981,311 B2 | 1/2006 | Seith et al. |
| 7,034,711 B2 | 4/2006 | Sakatani et al. |
| 7,035,710 B2 | 4/2006 | Balling |
| 7,035,898 B1 | 4/2006 | Baker |
| 7,036,703 B2 | 5/2006 | Grazioli et al. |
| 7,062,998 B2 | 6/2006 | Hohmann et al. |
| 7,064,502 B2 | 6/2006 | Garcia et al. |
| 7,086,483 B2 | 8/2006 | Arimura et al. |
| 7,102,303 B2 | 9/2006 | Brotto et al. |
| 7,112,934 B2 | 9/2006 | Gilmore |
| 7,116,969 B2 | 10/2006 | Park |
| 7,123,149 B2 | 10/2006 | Nowak et al. |
| 7,137,541 B2 | 11/2006 | Baskar et al. |
| 7,211,972 B2 | 5/2007 | Garcia et al. |
| 7,218,227 B2 | 5/2007 | Davis et al. |
| 7,243,400 B2 | 7/2007 | DeKeyser |
| 7,298,240 B2 | 11/2007 | Lamar |
| 7,328,086 B2 | 2/2008 | Perry et al. |
| 7,328,757 B2 | 2/2008 | Davies |
| 7,330,129 B2 | 2/2008 | Crowell et al. |
| 7,336,181 B2 | 2/2008 | Nowak et al. |
| 7,343,764 B2 | 3/2008 | Solfronk |
| 7,346,406 B2 | 3/2008 | Brotto et al. |
| 7,346,422 B2 | 3/2008 | Tsuchiya et al. |
| 7,359,762 B2 | 4/2008 | Etter et al. |
| 7,382,272 B2 | 6/2008 | Feight |
| 7,383,882 B2 | 6/2008 | Lerche et al. |
| 7,437,204 B2 | 10/2008 | Lev-Ami et al. |
| 7,464,769 B2 | 12/2008 | Nakazawa et al. |
| 7,501,778 B2 | 3/2009 | Hashimoto et al. |
| 7,540,334 B2 | 6/2009 | Gass et al. |
| 7,613,590 B2 | 11/2009 | Brown |
| 7,646,155 B2 | 1/2010 | Woods et al. |
| RE41,185 E | 3/2010 | Gilmore et al. |
| 7,690,569 B2 | 4/2010 | Swanson et al. |
| 7,750,811 B2 | 7/2010 | Puzio et al. |
| 7,772,850 B2 | 8/2010 | Bertness |
| 7,784,104 B2 | 8/2010 | Innami et al. |
| 7,787,981 B2 | 8/2010 | Austin et al. |
| 7,795,829 B2 | 9/2010 | Seiler et al. |
| 7,809,495 B2 | 10/2010 | Leufen |
| 7,817,062 B1 | 10/2010 | Li et al. |
| 7,834,566 B2 | 11/2010 | Woods et al. |
| 7,850,071 B2 | 12/2010 | Sakamoto et al. |
| 7,868,591 B2 | 1/2011 | Phillips et al. |
| 7,898,403 B2 | 3/2011 | Ritter et al. |
| 7,900,524 B2 | 3/2011 | Calloway et al. |
| 7,911,379 B2 | 3/2011 | Cameron |
| 7,928,673 B2 | 4/2011 | Woods et al. |
| 7,928,845 B1 | 4/2011 | LaRosa |
| 7,931,096 B2 | 4/2011 | Saha |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,982,624 B2 | 7/2011 | Richter et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,044,796 B1 | 10/2011 | Carr, Sr. |
| 8,049,636 B2 | 11/2011 | Buckingham et al. |
| 8,161,613 B2 | 4/2012 | Schuele et al. |
| 8,169,298 B2 | 5/2012 | Wiesner et al. |
| 8,171,828 B2 | 5/2012 | Duvan et al. |
| 8,210,275 B2 | 7/2012 | Suzuki et al. |
| 8,243,278 B2 | 8/2012 | Valois |
| 8,255,358 B2 | 8/2012 | Ballew et al. |
| 8,260,452 B2 | 9/2012 | Austin et al. |
| 8,264,374 B2 | 9/2012 | Obatake et al. |
| 8,281,871 B2 | 10/2012 | Cutler et al. |
| 8,286,723 B2 | 10/2012 | Puzio et al. |
| 8,294,424 B2 | 10/2012 | Bucur |
| 8,306,836 B2 | 11/2012 | Nichols et al. |
| 8,310,206 B2 | 11/2012 | Bucur |
| 8,316,958 B2 | 11/2012 | Schell et al. |
| 8,330,426 B2 | 12/2012 | Suzuki et al. |
| 8,344,879 B2 | 1/2013 | Harmon et al. |
| 8,351,982 B2 | 1/2013 | Rofougaran |
| 8,406,697 B2 | 3/2013 | Arimura et al. |
| 8,412,179 B2 | 4/2013 | Gerold et al. |
| 8,438,955 B2 | 5/2013 | Wilson, Jr. et al. |
| 8,441,212 B2 | 5/2013 | Kim |
| 8,464,808 B2 | 6/2013 | Leü |
| 8,485,049 B2 | 7/2013 | Yokoyama et al. |
| 8,576,095 B2 | 11/2013 | Harmon et al. |
| 8,611,250 B2 | 12/2013 | Chen et al. |
| 8,645,176 B2 | 2/2014 | Walton et al. |
| 8,657,482 B2 | 2/2014 | Malackowski et al. |
| 8,666,936 B2 | 3/2014 | Wallace |
| 8,678,106 B2 | 3/2014 | Matsunaga et al. |
| 8,818,617 B2 | 8/2014 | Miller et al. |
| 8,823,322 B2 | 9/2014 | Noda et al. |
| 8,890,449 B2 | 11/2014 | Suzuki et al. |
| 8,919,456 B2 | 12/2014 | Ng et al. |
| 8,952,626 B2 | 2/2015 | Huang et al. |
| 8,954,222 B2 | 2/2015 | Costantino |
| 8,954,227 B2 | 2/2015 | Bertosa et al. |
| 8,965,841 B2 | 2/2015 | Wallace |

(56) References Cited

U.S. PATENT DOCUMENTS

| | | | |
|---|---|---|---|
| 8,981,680 B2 | 3/2015 | Suda et al. |
| 8,996,237 B2 | 3/2015 | Bertosa et al. |
| 9,002,572 B2 | 4/2015 | Lipscomb et al. |
| 9,030,145 B2 | 5/2015 | Brennenstuhl et al. |
| 9,031,585 B2 | 5/2015 | Kahle et al. |
| 9,038,743 B2 | 5/2015 | Aoki |
| 9,061,392 B2 | 6/2015 | Forgues et al. |
| 9,063,558 B2 | 6/2015 | Fukumura |
| 9,073,134 B2 | 7/2015 | Koeder et al. |
| 9,094,793 B2 | 7/2015 | Kusakari et al. |
| 9,111,234 B2 | 8/2015 | Wallace et al. |
| 9,126,317 B2 | 9/2015 | Lawton et al. |
| 9,144,875 B2 | 9/2015 | Schlesak et al. |
| 9,194,917 B2 | 11/2015 | Brochhaus |
| 9,216,505 B2 | 12/2015 | Rejman et al. |
| 9,232,614 B2 | 1/2016 | Hiroi |
| 9,233,457 B2 | 1/2016 | Wanek et al. |
| 9,242,356 B2 | 1/2016 | King et al. |
| 9,253,857 B2 | 2/2016 | Van Der Werff |
| 9,256,988 B2 | 2/2016 | Wenger et al. |
| 9,257,865 B2 | 2/2016 | Hiuggins et al. |
| 9,281,770 B2 | 3/2016 | Wood et al. |
| 9,408,268 B2 | 8/2016 | Recker et al. |
| 9,466,198 B2 | 10/2016 | Burch et al. |
| 9,536,452 B2 | 1/2017 | Lydecker et al. |
| 9,674,931 B1 | 6/2017 | Chen et al. |
| 9,681,510 B2 | 6/2017 | van de Ven |
| 9,800,431 B2 | 10/2017 | Vollmer et al. |
| 9,900,957 B2 | 2/2018 | van de Ven et al. |
| 9,900,967 B2 * | 2/2018 | Isaacs ............... H05B 37/0245 |
| 9,916,739 B2 | 3/2018 | Suzuki |
| 10,165,658 B2 * | 12/2018 | Yoo ................... H04M 1/72533 |
| 10,349,498 B2 * | 7/2019 | Isaacs ............... H05B 37/0272 |
| 10,433,405 B2 * | 10/2019 | Isaacs ............... H05B 37/0227 |
| 2001/0052416 A1 | 12/2001 | Wissmach et al. |
| 2002/0033267 A1 | 3/2002 | Schweizer et al. |
| 2003/0121677 A1 | 3/2003 | Kady et al. |
| 2004/0182587 A1 | 9/2004 | May et al. |
| 2005/0035659 A1 | 2/2005 | Hahn et al. |
| 2006/0009879 A1 | 1/2006 | Lynch et al. |
| 2006/0076385 A1 | 4/2006 | Etter et al. |
| 2007/0252675 A1 | 11/2007 | Lamar |
| 2008/0084334 A1 | 4/2008 | Ballew |
| 2008/0086320 A1 | 4/2008 | Ballew |
| 2008/0086323 A1 | 4/2008 | Ballew et al. |
| 2008/0086349 A1 | 4/2008 | Petrie et al. |
| 2008/0086427 A1 | 4/2008 | Petrie |
| 2008/0086428 A1 | 4/2008 | Wallace |
| 2008/0086685 A1 | 4/2008 | Janky et al. |
| 2008/0143493 A1 | 6/2008 | Nam et al. |
| 2008/0252446 A1 | 10/2008 | Dammertz |
| 2009/0250364 A1 | 10/2009 | Gerold et al. |
| 2009/0251330 A1 | 10/2009 | Gerold et al. |
| 2009/0273436 A1 | 11/2009 | Gluck et al. |
| 2010/0096151 A1 | 4/2010 | Östling |
| 2010/0116519 A1 | 5/2010 | Gareis |
| 2010/0154599 A1 | 6/2010 | Gareis |
| 2010/0176766 A1 | 7/2010 | Brandner et al. |
| 2010/0271178 A1 | 10/2010 | Ahmad |
| 2011/0056716 A1 | 3/2011 | Jönsson et al. |
| 2011/0067895 A1 | 3/2011 | Nobe et al. |
| 2011/0073343 A1 | 3/2011 | Sawano et al. |
| 2011/0121782 A1 | 5/2011 | Marsh et al. |
| 2011/0127916 A1 | 6/2011 | Kim |
| 2011/0162858 A1 | 7/2011 | Coste |
| 2011/0309931 A1 | 12/2011 | Rose |
| 2012/0098445 A1 | 4/2012 | Park et al. |
| 2012/0167721 A1 | 7/2012 | Fluhrer |
| 2012/0168189 A1 | 7/2012 | Eckert |
| 2012/0267134 A1 | 10/2012 | Matthias et al. |
| 2012/0292070 A1 | 11/2012 | Ito et al. |
| 2012/0325507 A1 | 12/2012 | Fluhrer et al. |
| 2013/0024245 A1 | 1/2013 | Nichols et al. |
| 2013/0062086 A1 | 3/2013 | Ito et al. |
| 2013/0071815 A1 | 3/2013 | Hudson et al. |
| 2013/0087355 A1 | 4/2013 | Oomori et al. |
| 2013/0109375 A1 | 5/2013 | Zeiler et al. |
| 2013/0118767 A1 | 5/2013 | Cannaliato et al. |
| 2013/0126202 A1 | 5/2013 | Oomori et al. |
| 2013/0133907 A1 | 5/2013 | Chen et al. |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0304545 A1 | 11/2013 | Ballew et al. |
| 2013/0327552 A1 | 12/2013 | Lovelass et al. |
| 2014/0006295 A1 | 1/2014 | Zeiler et al. |
| 2014/0008093 A1 | 1/2014 | Patel et al. |
| 2014/0015389 A1 | 1/2014 | Vatterott et al. |
| 2014/0069672 A1 | 3/2014 | Mashiko et al. |
| 2014/0107853 A1 | 4/2014 | Ashinghurst et al. |
| 2014/0122143 A1 | 5/2014 | Fletcher et al. |
| 2014/0133400 A1 | 5/2014 | Ruan et al. |
| 2014/0149416 A1 | 5/2014 | Wallace |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1 | 7/2014 | Volpert |
| 2014/0240125 A1 | 8/2014 | Burch et al. |
| 2014/0265568 A1 | 9/2014 | Crafts et al. |
| 2014/0266024 A1 | 9/2014 | Chinnadurai et al. |
| 2014/0268697 A1 | 9/2014 | Smith et al. |
| 2014/0284070 A1 | 9/2014 | Ng et al. |
| 2014/0292245 A1 | 10/2014 | Suzuki et al. |
| 2014/0316837 A1 | 10/2014 | Fosburgh et al. |
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1 | 12/2014 | Phillips et al. |
| 2014/0379136 A1 | 12/2014 | Schlegel et al. |
| 2015/0000944 A1 | 1/2015 | Dusselberg et al. |
| 2015/0002089 A1 | 1/2015 | Rejman et al. |
| 2015/0042247 A1 | 2/2015 | Kusakawa |
| 2015/0084745 A1 | 3/2015 | Hertz et al. |
| 2015/0122524 A1 | 5/2015 | Papp |
| 2015/0127205 A1 | 5/2015 | Brochhaus |
| 2015/0135306 A1 | 5/2015 | Winkler et al. |
| 2015/0135907 A1 | 5/2015 | Hirabayashi et al. |
| 2015/0137721 A1 | 5/2015 | Yamamoto et al. |
| 2015/0158157 A1 | 6/2015 | Hirabayashi et al. |
| 2015/0158170 A1 | 6/2015 | Nitsche et al. |
| 2015/0171654 A1 | 6/2015 | Horie et al. |
| 2015/0179036 A1 | 6/2015 | Heine et al. |
| 2015/0191096 A1 | 7/2015 | Becker et al. |
| 2015/0200788 A1 | 7/2015 | Thomas et al. |
| 2015/0340921 A1 | 11/2015 | Suda et al. |
| 2016/0129569 A1 | 5/2016 | Lehnert et al. |
| 2016/0286616 A1 | 9/2016 | van de Ven |
| 2016/0348879 A1 | 12/2016 | Young et al. |
| 2017/0008159 A1 | 1/2017 | Boeck et al. |
| 2017/0041071 A1 | 2/2017 | Ryan et al. |
| 2018/0168021 A1 | 6/2018 | Isaacs et al. |

FOREIGN PATENT DOCUMENTS

| | | |
|---|---|---|
| WO | WO 2006036481 A2 | 4/2006 |
| WO | WO 2014138822 A1 | 9/2014 |
| WO | WO 2015103482 | 7/2015 |
| WO | WO 2015135033 | 9/2015 |
| WO | WO 2015149680 | 10/2015 |

(56) References Cited

FOREIGN PATENT DOCUMENTS

OTHER PUBLICATIONS

New Zealand Patent Office Examination Report for Application No. 742034 dated Oct. 19, 2018 (5 pages).
International Search Report and Written Opinion for Application No. PCT/US2016/059598 dated Jan. 31, 2017 (13 pages).
Chinese Patent Office Search Report and Office Action for Application No. 201680077018.9 dated Apr. 22, 2019 (8 pages including statement of relevance).
European Patent Office Examination Report for Application No. 16861014.5 dated Jan. 2, 2020 (5 pages).
Chinese Patent Office Action for Application No. 201680077018.9 dated Nov. 7, 2019 (18 pages including English translation).

* cited by examiner

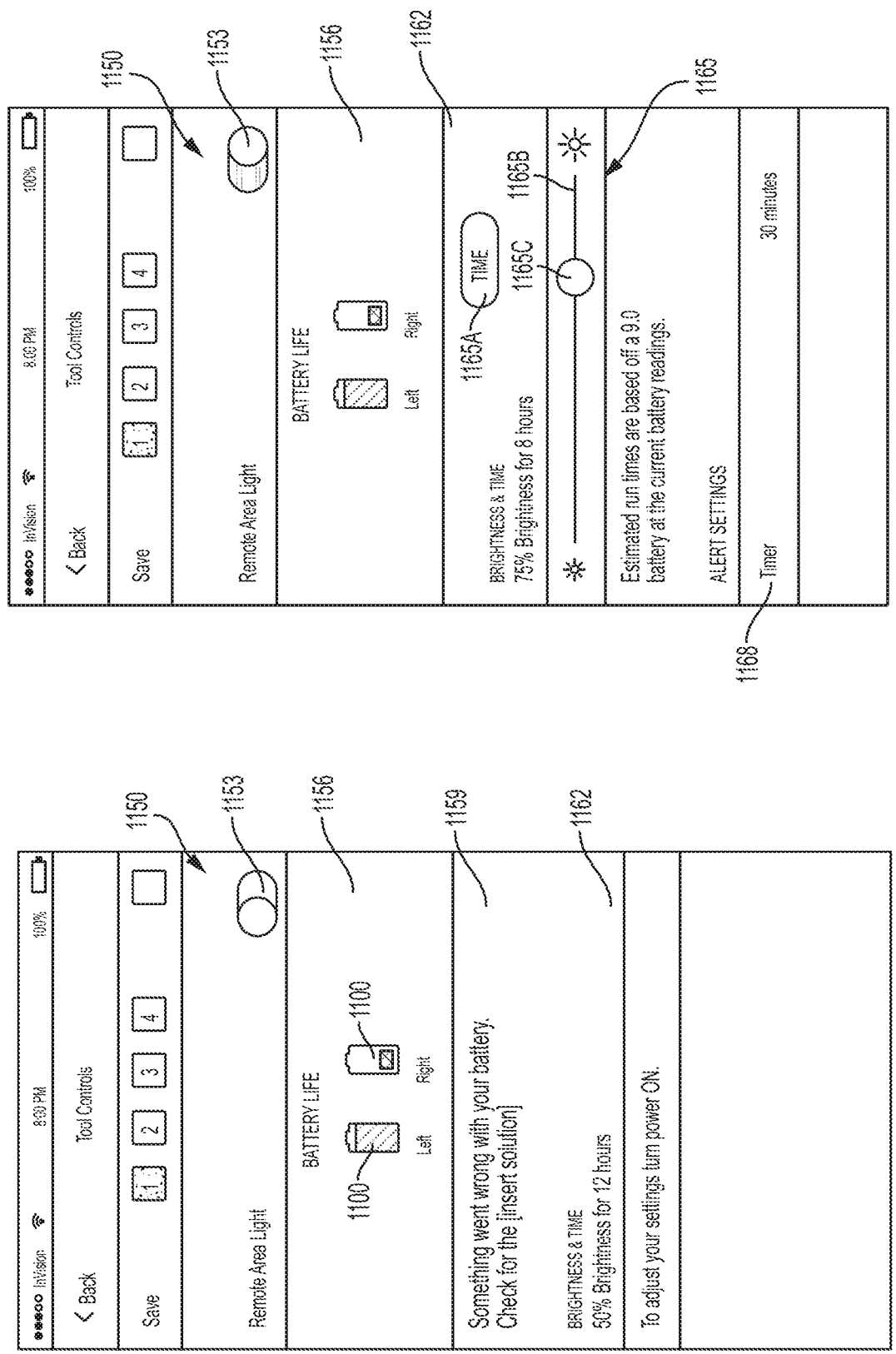

REMOTE LIGHT CONTROL, CONFIGURATION, AND MONITORING

RELATED APPLICATIONS

This application is a continuation of U.S. patent application Ser. No. 16/377,804, filed Apr. 8, 2019, which is a continuation of U.S. patent application Ser. No. 15/878,745, filed Jan. 24, 2018, now U.S. Pat. No. 10,349,498, which is a continuation of U.S. patent application Ser. No. 15/338,308, filed Oct. 28, 2016, now U.S. Pat. No. 9,900,967, which claims priority to U.S. Provisional Patent Application No. 62/248,856, filed on Oct. 30, 2015, the entire contents of which are hereby incorporated by reference.

BACKGROUND

The present invention relates to a network of lights used in, for example, a job site.

SUMMARY

In one embodiment, the invention provides a system of light devices including a first light device and a second light device. The first light device having a first housing, a first light, a first transceiver, a first electronic processor. The second light having a second housing, a second light, a second transceiver, a second electronic processor. The first electronic processor is coupled to the first light and the first transceiver, and configured to control operation of the first light, and transmit, via the first transceiver a command to the second light device. The second electronic processor coupled to the second light and the second transceiver, and configured to receive, via the second transceiver, the command from the first light device, and change an operational parameter of the second light in response to the command from the first light device.

In another embodiment, the invention provides a method of remotely controlling a light device. The method includes activating, by a first electronic processor, a first light of a first light device. The method also includes transmitting, by the first electronic processor and via a first transceiver, a command to a second light device, receiving, by a second electronic processor and via a second transceiver of the second light device, the command from the first light device, and changing an operational parameter of a second light of the second light device in response to the command from the first light device.

Other aspects of the invention will become apparent by consideration of the detailed description and accompanying drawings.

BRIEF DESCRIPTION OF THE DRAWINGS

FIGS. 20A-B illustrate exemplary screenshots of another settings screen for the light device of the communication system of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Figure 1:
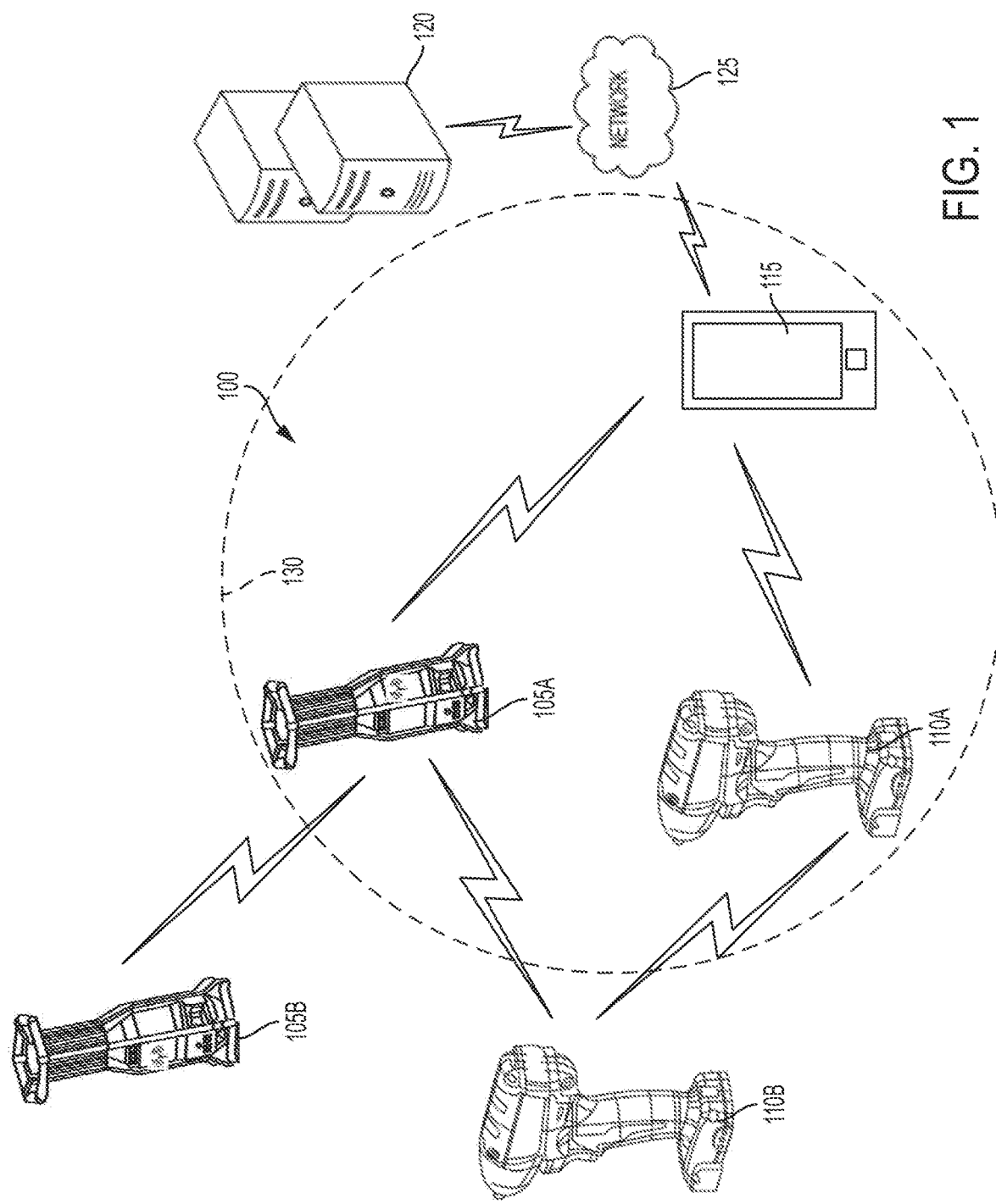
FIG. 1 illustrates a communication system according to one embodiment of the invention.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations FIG. 1 illustrates a communication system 100 that facilitates operation and control of multiple light devices and/or power tool devices through the use of an external device. The communication system 100 includes light devices 105a-b, power tool devices 110a-b, and at least one external device 115. The external device 115 is configured to communicate with a remote server 120 over a network 125. The external device 115 is configured to communicate with power tool devices 110a and light devices 105a that are within a direct communication range 130 of the external device 115. Similarly, each light device 105a-b and each power tool device 110a-b within the communication system 100 is configured to communicate with other devices (e.g., the external device 115, another light device 105, another power tool device 110) that are within a communication range of the light device 105 or the power tool device 110, respectively. The communication range 130 of the external device 115 (and of the light devices 105 and the power tool devices 110) may change based on, for example, the communication protocol used by the external device 115 to communicate with the power tool devices 110a-b and the light devices 105a-b, obstructions between the external device 115 and the light devices 105a-b and the power tool devices 110a-b, power available to the external device 115, and other factors.

In the illustrated embodiment, the power tool devices 110a-b and the light devices 105a-b form a mesh network (e.g., a wireless ad hoc network) to extend the communication range 130 of the external device 115. In the illustrated example, a first power tool device 110a and a first light device 105a are within the communication range 130, while a second power tool device 110b and a second light device 105b are outside the communication range 130. The second power tool device 110b and the second light device 105b utilize the first power tool device 110a and/or the first light device 105a as communication bridges to communicate with the external device 115. In other words, the second power tool device 110b and/or the second light device 105b communicate with the first power tool device 110a and/or the first light device 105a. The first power tool device 110a and/or the first light device 105a then transmit the message to the external device 115. Similarly, the external device 115 may send messages to the second light device 105b and/or the second power tool device 110b, and may use the first light device 105a and/or the first power tool device 110a as communication bridges to reach the second light device 105b and/or the second power tool device 110b. Therefore, light devices 105 outside the direct communication range 130 of the external device 115 may still be controlled and may communicate with the external device 115 by utilizing the mesh network.

Figure 2:
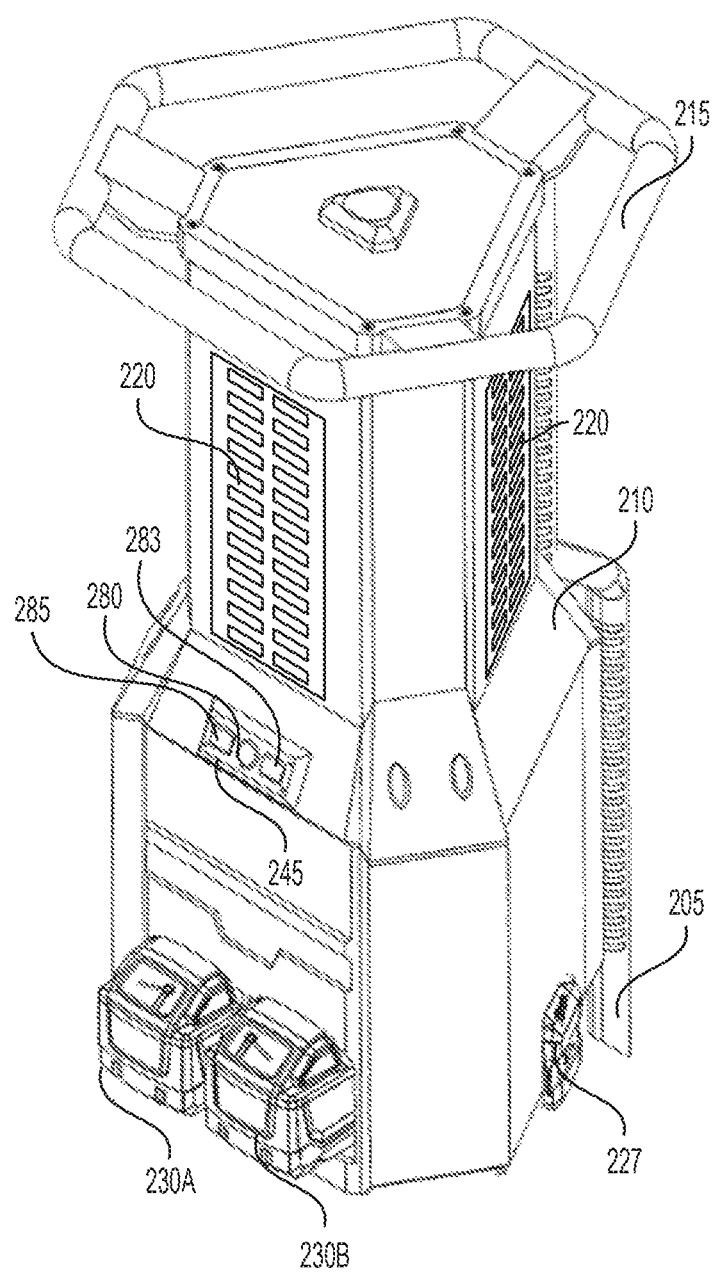
FIG. 2 is a perspective view of an exemplary light device of the communication system of FIG. 1.
Figure 3:
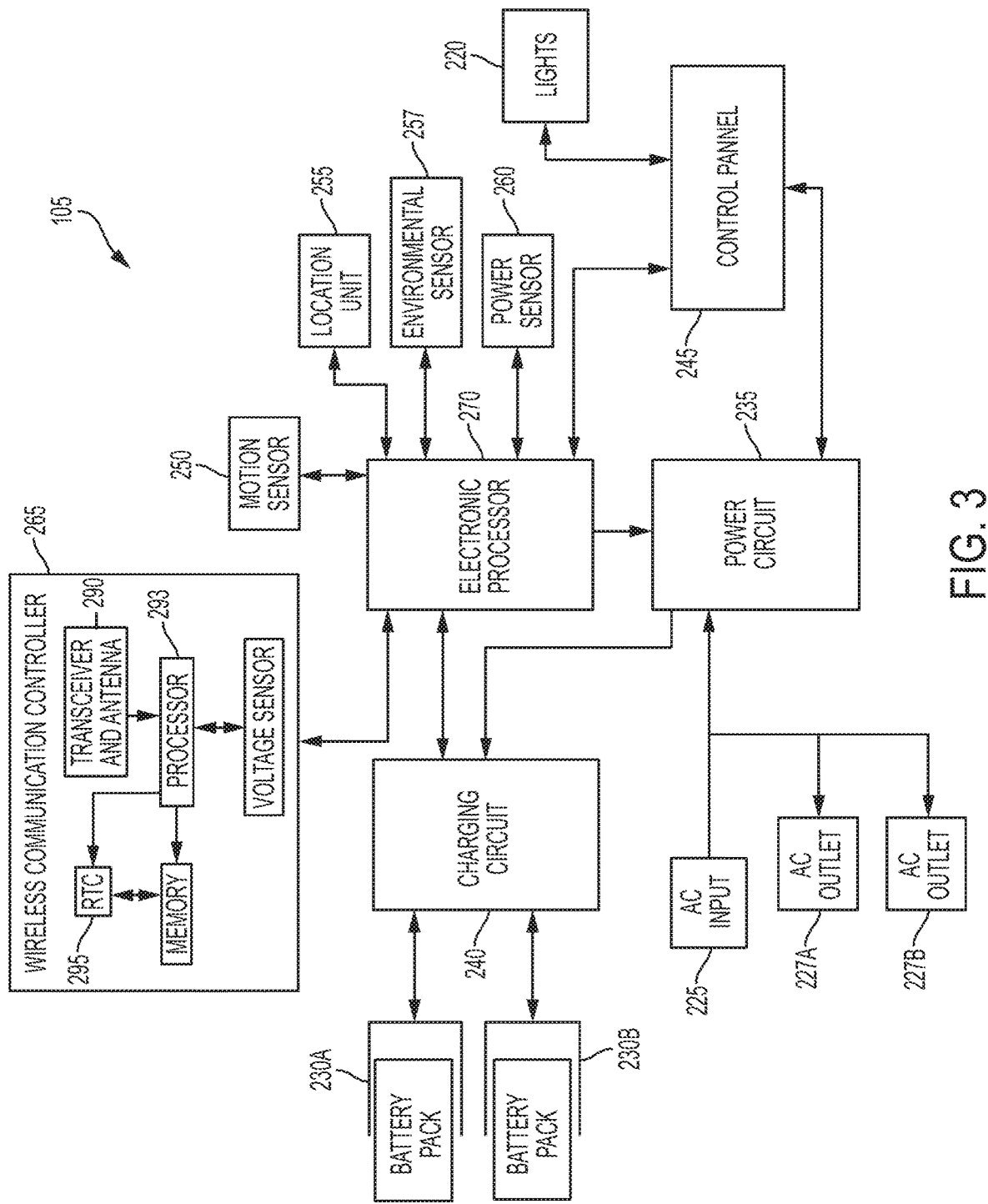
FIG. 3 is a schematic diagram of the exemplary light device of FIG. 2.

FIG. 2 illustrates an exemplary light device 105. The exemplary light device 105 of FIG. 2, is a self-standing vertical area light. In other embodiments, however, the light device 105 (or some of the light devices 105) may have a different construction and may include different components. For example, in other embodiments, the light devices 105 may include mountable and/or compact flood lights, stick lights, site lights, flashlights, among others. The exemplary light device 105 of FIGS. 2 and 3 provides lighting capabilities as well as other functionality, for example, charging of battery packs, power outlets for other devices, environmental sensing, and the like. In some embodiments, some of the light devices 105 may include some or none of the additional functionality listed above. The light device 105 includes a base 205, a light body 210, and a light head 215. The light body 210 and the light head 215 are supported by the base 205. The light body 210 houses a plurality of lights 220. The plurality of lights 220 may be divided into strips such that each strip may be controlled individually. In the illustrated embodiment, the plurality of lights 220 are LEDs.

Besides providing support for the light device 105, the base 205 also houses the electrical components of the light device 105. FIG. 3 is a schematic diagram for the exemplary light device 105. As shown in FIG. 3, the light device 105 includes an alternating current (AC) power input 225, AC power outlets 227, battery pack ports 230a-b, a power circuit 235, a charging circuit 240, control panel 245, a motion sensor 250, a location unit 255, an environmental sensor 257, a power sensor 260, a wireless communication controller 265, and an electronic processor 270. The AC power input 225 is configured to receive AC power from an external AC power source (e.g., a power distribution box, a household power outlet, a generator, and the like). The power received through the AC power input 225 can be provided to other electronic devices through the AC power outlets 227. In some embodiments, the AC power outlets 227 may allow several light devices 105 to be daisy-chained from each other.

The power received through the AC power input 225 is then transferred to the power circuit 235. The power circuit 235 receives the power from the AC power input 225 and converts it to power with specific characteristics to power components of the light device 105. For example, the power circuit 235 may include an AC-to-DC converter, a filter, a rectifier, a step-down controller, a PWM control, and/or other components that change characteristics of the power received through the AC power input 225. The power circuit 235 is coupled to other components of the light device 105. In the illustrated embodiment, the power circuit 235 is coupled to the electronic processor 270, the charging circuit 240, and the lights 220. The power circuit 235 may provide different power outputs to each of the charging circuit 240, the electronic processor 270, and the lights 220. For example, the power circuit 235 may provide sufficient current to charge one or more battery packs to the charging circuit 240, but may provide a significantly lower power rating to the electronic processor 270 and/or to the sensors 250, 255, 257, 260. The power circuit 235 may receive control signals from the electronic processor 270 to control the power provided to the lights 220.

The charging circuit 240 provides charging power to the battery pack ports 230a-b. In the illustrated embodiment, the battery pack ports 230a-b receive a slide-on battery pack. In other embodiments, the battery pack ports 230a-b may receive a different type of battery pack, and/or each battery pack port 230a-b may be constructed differently to each receive a different type of battery pack. In some embodiments, the power circuit 235 receives power from the battery pack ports 230a-b, and may, in such embodiments, power the lights 200 with power from a connected battery pack. In some embodiments, some or all of the light devices 105 do not include the charging circuit 240, and may be configured to receive power through the battery pack ports 230a-b, but not recharge the connected battery packs.

The control panel 245 allows a user to control the operation of the light device 105. The control panel 245 may include a combination of virtual and physical actuators. Referring back to FIG. 2, in the illustrated embodiment, the control panel 245 includes a light intensity control 280, a light intensity indicator 283, and a state of charge indicator 285. The light intensity control 280 may also operate as a power button toggling the light device 105 on and off (e.g., by changing from a fully on state to a fully off state). The state of charge indicator 285 illustrates a relative state of charge of one or more of the connected battery packs. In one embodiment, the state of charge indicator 285 includes a plurality of indicator bars that depict the level of charge of the connected battery packs. The light intensity control 280 may include, for example, a button. Each press of the light intensity control 280 changes the intensity of the lights 220. In some embodiments, when the light device 105 is powered through an external AC source, the light intensity control 280 rotates among six different light intensity levels, but when the light device 105 is powered through a DC power source (e.g., a battery pack), the light intensity control only rotates through three light intensity levels. The light intensity indicator 283 may include, for example, an LED that changes in brightness or flashing frequency based on the light intensity level of the light device 105. In some embodiments, the light intensity indicator 283 includes indicator bars that depict the light intensity level of the light device 105 by increasing or decreasing the number of indicator bars that are illuminated.

The motion sensor 250 is coupled to the electronic processor 270. The motion sensor is configured to detect motion of an object within a proximity range of the light device 105. The motion sensor 250 can be active or passive. For example, in one embodiment, the motion sensors can include a passive infrared sensor (PIR) to detect when people come within range of the sensor. In other embodiments, the motion sensor 250 may detect changes in light and determine that an object moved when the change of light exceeds a predetermined threshold. In yet other embodiments, other types of motion sensors 250 are used. When the motion sensor 250 detects motion (e.g., of a person or an object), the motion sensor 250 generates and sends an activation signal to the electronic processor 270. The electronic processor 270 may then change an operation of the lights 220 in response to the detected motion, may transmit a message to the external device 115, or the like. In some embodiments, the light device 105 do not include the motion sensor 250 described above.

The location unit 255 includes, for example, a Global Positioning System (GPS) unit. The location unit 255 determines a location of the light device 105 and sends the determined location to the electronic processor 270. In some embodiments, the light device 105 may not include a location unit 255 and may be configured to determine its location by communicating with other light devices 105 and/or with an external device 115. The environmental sensor 257 may include, for example, a carbon monoxide sensor, a gas buildup sensor, a humidity sensor, a dust sensor, and/or a similar sensor. The environmental sensor 257 detects when an environmental parameter is outside a predetermined threshold and generates an alert signal to the electronic processor 270. The electronic processor 270 may then generate a signal to alert the user that a particular environmental parameter is outside an expected range. Each light device 105 may include one, more, or no environmental sensors. As described above, the light device 105 may also include a power sensor 260. The power sensor 260 is coupled to the electronic processor 270 and, in some embodiments, is also coupled to the battery pack ports 230a-b and to the AC power input 225. The power sensor 260 detects the incoming power to the light device 105. In some embodiments, the power sensor 260 also monitors and measures power consumption of the light device 105, and may be able to determine which components of the light device 105 are consuming more or less power. The power sensor 260 provides these measurements to the electronic processor 270.

The wireless communication controller 265 is coupled to the electronic processor 270, and exchanges wireless messages with other light devices 105 in the communication system 100, the external device 115, and/or power tool devices 110 in the communication system 100. The wireless communication controller 265 includes a transceiver 290, a processor 293, and a real-time clock 295. The transceiver 290 sends and receives wireless messages to and from other light devices 105, power tool devices 110, and/or the external device 115. In some embodiments, such as the illustrated embodiment, the wireless communication controller 265 also includes a memory. The memory stores instructions to be implemented by the processor 293 and/or data related to communications between the light device 105 and other devices of the communication system 100. The processor 293 of the wireless communication controller 265 controls wireless communications between the light device 105a and other devices within the communication system 100. For example, the processor 293 of the wireless communication controller 265 buffers incoming and/or outgoing data, communicates with the electronic processor 270, and determines the communication protocol and/or settings to use in wireless communications.

In the illustrated embodiment, the wireless communication controller 265 is a Bluetooth® controller. The Bluetooth® controller communicates with other devices (e.g., other light devices 105, external device 115, and/or power tool devices 110) employing the Bluetooth® protocol. In other embodiments, the wireless communication controller 265 communicates using other protocols (e.g., Wi-Fi, cellular protocols, a proprietary protocol, etc.) over different type of wireless networks. For example, the wireless communication controller 265 may be configured to communicate via Wi-Fi through a wide area network such as the Internet or a local area network, or to communicate through a piconet (e.g., using infrared or NFC communications). In some embodiments, the communication exchanged by the wireless communication controller 265 may be encrypted to protect the data exchanged between the light device 105 and the external device/network 115 from third parties.

The wireless communication controller 265 receives data from the electronic processor 270 and prepares outgoing messages to other light devices 105, power tool devices 110, and/or to the external device 115. For example, the wireless communication controller 265 may send information regarding the outputs from the sensors 250, 255, 257, 260 of the light device 105, regarding the current operational parameters of the light device 105 (e.g., a current brightness, power consumption remaining runtime, and the like), enabled/disabled features of the light device 105, an identification signal and/or code for the particular light device 105, maintenance information for the light device 105, usage information for the light device 105, and the like. The wireless communication controller 265 may send information, for example, regarding number of activations for a particular sensor 250, 255, 257, 260, data and time of the activations, raw data recorded and/or detected by the particular sensor 250, 255, 257, 260, and the like.

The wireless communication controller 265 also receives wireless messages and/or commands from other light devices 105, power tool devices 110, and/or the external device 115. The wireless messages and/or commands from other devices may include programming and/or configuration information for the light device 105.

The real-time clock (RTC) 295 increments and keeps time independently of the other components of the light device 105. In some embodiments, the RTC 295 is coupled to a back-up power source, which provides power to the RTC 295 such that the RTC 295 continues to track time regardless of whether the light device 105 receives AC power, DC power (e.g., from a connected battery pack), or no power. Additionally, the RTC 295 enables time stamping of operational data (e.g., which may be stored for later export) and, may, in some embodiments, enable a security feature whereby a lockout time is set by a user and the light device 105 is locked-out when the time of the RTC 295 exceeds the set lockout time.

The processor 293 of the wireless communication controller 265 switches between operating in a connectable (e.g., full power) state and operating in an advertisement state. In the illustrated embodiment, the wireless communication controller 265 switches between operating in the connectable state and the advertisement state based on whether the light device 105 receives power from an external source, or whether the light device 105 is disconnected from an external power source. For example, the wireless communication controller 265 operates in the connectable state when the light device 105 receives power from an external AC power source. The wireless communication controller 265 also operates in the connectable state when the light device 105 receives power through one of the battery pack ports 230 and the connected battery pack holds sufficient charge (i.e., the voltage of the connected battery pack is above a threshold). When the light device 105 is not connected to an outside power source, the wireless communication controller 265 may receive power from the back-up power source, and operates in the advertisement state.

When the wireless communication controller 265 operates in the advertisement state, the light device 105 generates and broadcasts an identification signal, but data exchange between the light device 105 is limited to select information. In other words, in the advertisement state, the wireless communication controller 265 outputs an advertisement message including identification information regarding the light device identity, remaining capacity of the back-up power source (e.g., if one is included), and other limited information about the light device. The advertisement message may also identify the product as being from a particular manufacturer or brand via a unique binary identification "UBID." The unique binary identification UBID identifies the type of light device and also provides a unique identifier for the particular light device (e.g., a serial number). Therefore, the external device 115, and the light devices 105 and other power tool devices 110 can identify the light device 105 even when the wireless communication controller 265 operates in the advertisement state.

When the wireless communication controller 265 operates in the connectable state, full wireless communication between the light device 105 and other devices in the communication system 100 (e.g., power tool devices 110 and the external device 115) is enabled. From the connectable state, the wireless communication controller 265 can establish a communication link (e.g., pair) with another device (e.g., another light device 105, a power tool device 110, and/or the external device 115) to obtain and export usage data for the light device 105, maintenance data, operation mode information, outputs from the sensors 250, 255, 257, 260, and the like from the light device 105 (e.g., light device electronic processor 270). The exported information can be used by tool users or owners to log data related to a particular light device 105 or to specific job activities.

The exported and logged data can indicate when the light device 105 was activated, and the power consumption of the light device 105. The logged data can also provide a chronological record of what areas were illuminated in a chronological order or in a geographical order. While paired with another device (e.g., the external device 115, a power tool device 110, or another light device 105), the wireless communication controller 265 also imports (i.e., receives) information from the other devices (e.g., the external device 115, power tool device 110, and/or another light device 105) into the light device 105 such as, for example, configuration data, operation thresholds, maintenance threshold, configuring modes of operation of the light device, programming of the light device 105, programming for the light device 105, and the like.

The electronic processor 270 is coupled to the wireless communication controller 265, the sensors 250, 255, 257, 260, the control panel 245, the power circuit 235, and the charging circuit 240. The electronic processor 270 receives detection outputs from each of the sensors 250, 255, 257, 260. In response to some of the detection outputs, the electronic processor 270 changes an operational parameter of the light device 105 such that the operation of the light device 105 is altered based on a detection from a sensor 250, 255, 257, 260. For example, the electronic processor 270 may decrease the brightness of the lights 220 in response to detecting, via an environmental sensor 257, that the ambient light is above a threshold. The electronic processor 270 also stores (or sends to a memory for storage) some of the detection outputs from each of the sensors 250, 255, 257, 260, and may store additional information associated with the detection output (for example, time of detection, date of detection, and the like). The electronic processor 270 then controls the wireless communication controller 265 to send a wireless message to the external device 115 including information regarding one or more detection output from one of the sensors 250, 255, 257, 260. The wireless message may include an alarm message to the external device 115 (for example, when AC power to a light device 105 has been interrupted), or may be a notification message meant for updating information regarding the light device 105.

The electronic processor 270 receives signals from the control panel 245 indicating which controls were actuated by the user. The electronic processor 270 then sends control signals to the power circuit 235 such that the appropriate power is transmitted to the lights 220 to illuminate them according to the instructions received through the control panel 245. For example, the electronic processor 270 may receive a signal from the control panel 245 indicating that the light intensity control 280 has been actuated to increase the brightness of the lights 220. The electronic processor 270 may then instruct the power circuit 235 to increase the power provided to the lights 220 such that the light intensity of the lights 220 increases. The electronic processor 270 also receives commands and control signals from the external device 115 through the wireless communication controller 265, and transmits corresponding control signals to the power circuit 235 based on the received commands and control signals. The electronic processor 270 sends the control signals to the power circuit 235 such that the lights 220 are illuminated according to the instructions received from the external device 115.

Additionally, because each light device 105 may be part of a mesh network, the electronic processor 270 determines whether the control signals and/or other communications received through the transceiver 165 include the light device 105 as a final recipient, and forwards any necessary communications from the external device 115 in which the light device 105 is not its final destination.

Therefore, using the external device 115, a user can both control a light device 105 and/or access stored information regarding the light device 105. For example, a user may access stored light usage maintenance data through the external device 115. The light device usage information may allow a user to determine how the light device 105 has been used, whether maintenance is recommended or has been performed in the past, and identify malfunctioning components or other reasons for certain performance issues. The external device 115 can also transmit data to the light device 105 for light configuration, firmware updates, or to send commands (e.g., turn on a light). The external device 115 also allows a user to set operational parameters, safety parameters, group lights together, and the like for the light device 105.

Figure 4:
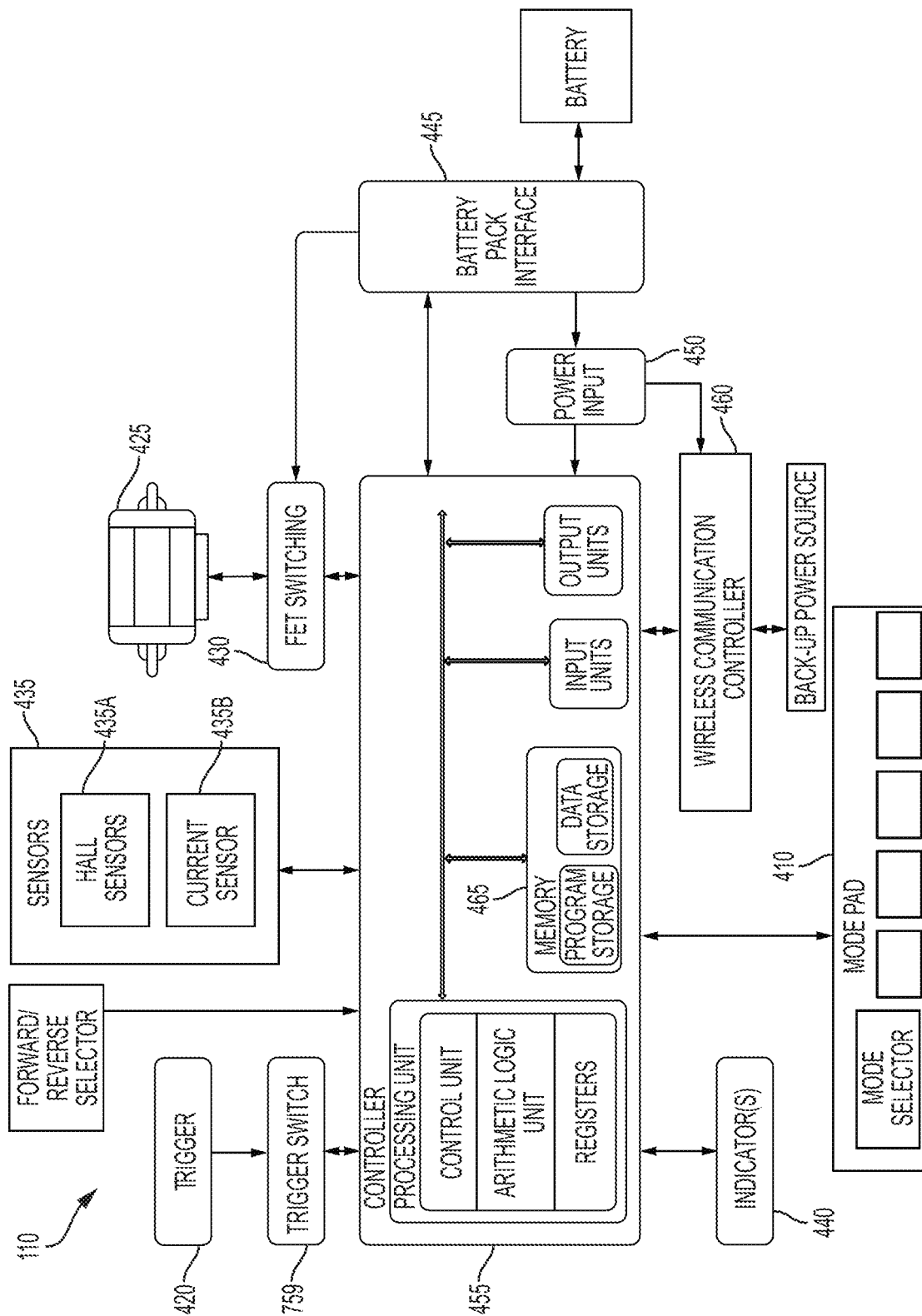
FIG. 4 is a schematic diagram of an exemplary power tool device of the communication system of FIG. 1.

FIG. 4 illustrates an exemplary power tool device 110. In the illustrated embodiments, the power tool device 110 includes a power tool. In other embodiments, however, the power tool device 110 may alternatively include a power tool battery pack, and/or a battery pack charger. In some embodiments, the power tool device 110 may include different type(s) of power tools. The power tool device 110 is configured to perform one or more specific tasks (e.g., drilling, cutting, fastening, pressing, lubricant application, sanding, heating, grinding, bending, forming, impacting, polishing, charging, providing output power, and the like). In the illustrated example, the power tool device 110 includes an impact wrench being associated with the task of generating a rotational output (e.g., to drive a bit), while a reciprocating saw, for example, is associated with the task of generating a reciprocating output motion (e.g., for pushing and pulling a saw blade). The task(s) associated with a particular power tool device may also be referred to as the primary function(s) of the power tool device 110. The particular power tool devices 110 illustrated and described herein (e.g., an impact driver) are merely representative. Other embodiments of the communication system 100 include a variety of types of power tool devices 110 (e.g., a power drill, a hammer drill, a pipe cutter, a sander, a nailer, a grease gun, a charger, a battery pack, etc.).

As shown in FIG. 4, the exemplary power tool device 110 includes an output device 405, a mode pad 410, a trigger 420, a motor 425, a switching network 430, sensors 435, indicators 440, a battery pack interface 445, a power input unit 450, a tool electronic processor 455, and a tool communication controller 460. The power tool device 110 receives power through the battery pack interface 445. The battery pack interface 445 mechanically and electrically couples to a battery pack for the power tool device 110. The battery pack interface 445 is also coupled to the power input unit 450, and transmits the power received from the battery pack to the power input unit 450. The power input unit 450 includes active and/or passive components (e.g., voltage step-down controllers or transformers, voltage converters, rectifiers, filters, and the like) to regulate and/or control the power received through the battery pack interface 445 and to the tool communication controller 460 and the tool electronic processor 455.

The power input unit 450 then selectively provides power to the switching network 430 based on a user input received through the trigger 420 and/or the mode pad 410, as well as from control signals from the tool electronic processor 455. The switching network 430 enables the tool electronic processor 455 to control the operation of the motor 425. Generally, when the trigger 420 is depressed (e.g., by a user), electrical current is supplied from the battery pack interface 445 to the motor 425, via the switching network 430. When the trigger 420 is not depressed, electrical current is not supplied from the battery pack interface 445 to the motor 425. The switching network 430 may include numerous FETs, bipolar transistors, or other types of electrical switches. For instance, the switching network 430 may include a six-FET bridge that receives pulse-width modulated (PWM) signals from the tool electronic processor 455 to drive the motor 425.

When the motor 425 is energized, the motor 425 drives the output device 405. In the illustrated embodiment, the output device 405 includes a socket. However, each power tool may have a different output device 405 specifically designed for the task (or primary function) associated with the power tool. For example, the drive device for a power drill may include a bit driver, while the drive device for a pipe cutter may include a blade. The mode pad 410 receives a user input indicating a desired mode of operation of the power tool device 110. The mode pad 410 also indicates to the user a currently selected mode of operation for the power tool device 110.

The power tool device 110 also includes sensors 435 that are coupled to the tool electronic processor 455. The sensors 435 communicate various signals indicative of different parameter of the power tool device 110. In the illustrated embodiments, the sensors 435 include Hall Effect sensors 435*a*, current sensors 435*b*, among other sensors, such as one or more voltage sensors, temperature sensors, torque sensors, and the like. The Hall Effect sensors 435*a* output motor feedback information to the tool electronic processor 455. The current sensors 435*b* may output information regarding the load current experienced by the motor 425. The indicators 440 are also coupled to the tool electronic processor 455 and receive control signals from the tool electronic processor 455 to turn on and off, or otherwise convey information based on different states of the power tool device 110. The indicators 440 include, for example, one or more light-emitting diodes ("LED"), or a display screen. The indicators 440 can be configured to display conditions of, or information associated with, the power tool device 110. For example, the indicators 440 are configured to indicate measured electrical characteristics of the power tool device 110, the status of the power tool device 110, the mode of the power tool device 110, etc. The indicators 440 may also include elements to convey information to a user through audible or tactile outputs.

As described above, the tool electronic processor 455 is electrically and/or communicatively connected to a variety of modules or components of the power tool device 110. In some embodiments, the tool electronic processor 455 includes a plurality of electrical and electronic components that provide power, operational control, and protection to the components and modules within the tool electronic processor 455 and/or power tool device 110. For example, the tool electronic processor 455 includes, among other things, a processing unit (e.g., a microprocessor, a microcontroller, or another suitable programmable device), a memory 465, input units, and output units. In some embodiments, the tool electronic processor 455 is implemented partially or entirely on a semiconductor (e.g., a field-programmable gate array ["FPGA"] semiconductor) chip, such as a chip developed through a register transfer level ("RTL") design process.

The memory 465 includes, for example, a program storage area 467a and a data storage area 467b. The program storage area 467a and the data storage area 467b can include combinations of different types of memory. The tool electronic processor 455 is connected to the memory 465 and executes software instructions that are capable of being stored in a RAM of the memory 465 (e.g., during execution), a ROM of the memory 465 (e.g., on a generally permanent basis), or another non-transitory computer readable medium such as another memory or a disc. Software included in the implementation of the power tool device 110 can be stored in the memory 465 of the power tool device 110. The software includes, for example, firmware, one or more applications, program data, filters, rules, one or more program modules, and other executable instructions.

The tool electronic processor 455 is configured to retrieve from memory 465 and execute, among other things, instructions related to the control processes and methods described herein. The tool electronic processor 455 is also configured to store power tool device information on the memory 465 including operational data, information identifying the type of power tool device, a unique identifier for the particular tool device, and other information relevant to operating or maintaining the power tool device 110. The tool device usage information, such as current levels, motor speed, motor acceleration, motor direction, number of impacts, may be captured or inferred from data output by the sensors 435. These tool device parameters are monitored by the tool electronic processor 455 to operate according to the mode selected via the mode pad 410. These parameters are also transmitted to other devices in the communication system 100 (e.g., light devices 105, the external device 115, and/or other power tool devices 110) to become accessible to a user. In other constructions, the tool electronic processor 455 includes additional, fewer, or different components.

The tool communication controller 460 is coupled to the tool electronic processor 455 and exchanges wireless messages with other power tool devices 110 in the communication system 100, the external device 115, and/or light devices 105 in the communication system 100. The tool communication controller 460 includes a transceiver 470, a processor 475, and a real-time clock 480. The tool communication controller 460 is similar in construction and in operation to the wireless communication controller 265 described above with reference to the exemplary light device 105, and description of the wireless communication controller 265 therefore analogously applies to the tool communication controller 460. For example, the tool communication controller 460 controls wireless communications between the power tool device 110 and other components of the communication system, includes a real-time clock 480 for time-stamping data received by the sensors 435, may operate using the Bluetooth® protocol (or another wireless communication protocol), switches operation between an advertisement mode and a connectable mode based on the power source for the power tool device 110, and may be powered by a back-up power source. The advertisement state and the connectable state of the tool communication controller 460 are similar to that described above with respect to the wireless communication controller 265 of the light device 105. For example, when the tool communication controller 460 operates in the advertisement state, data communication with the power tool device 110 is limited (e.g., to, for example, identification and/or location information associated with the power tool device 110). However, when the tool communication controller 460 operates in the connectable state, full bidirectional data communication with the power tool device 110 is enabled. For example, in the connectable state, the tool communication controller 460 may transmit information regarding usage data, maintenance data, mode information, drive device information, and the like from the power tool device 110.

The tool communication controller 460 operates in the advertisement state when the power tool device 110 is not connected to an external power source (e.g., is disconnected from a battery pack) or the connected power source does not have sufficient charge (e.g., the connected battery pack is nearly depleted). The tool communication controller 460 can switch to the connectable state when the external power source is connected to the power tool device 110 and hold sufficient charge to support bidirectional data exchange with the power tool device 110. In the illustrated embodiment, the tool communication controller 460 is configured to communicate with other power tool devices 110, light devices 105, and/or the external device 115. In other embodiments, however, the tool communication controller 460 may not communicate with other power tool devices 110, and may instead use the mesh network of the light devices 105 to extend its communication range with the external device 115. Using the external device 115, a user can determine how the power tool device 110 has been used, whether maintenance is recommended or has been performed in the past, and identify malfunctioning components or other reasons for certain performance issues. The external device 115 can also transmit data to the power tool device 110 for power tool configuration, firmware updates, or to send commands (e.g., turn on a work light). The external device 115 also allows a user to set operational parameters, safety parameters, select tool modes, and the like for the power tool device 110.

The exemplary power tool device 110 of FIG. 4 is described as a power tool. In another example, the power tool device may be a charger or a battery pack. In such embodiments, the power tool device 110 may not include a motor 425 and/or a switching network 430, and the output device 405 may include the battery terminals configured to transfer power. In such embodiments, the sensors 435 do not measure the position of the motor, and may instead measure, for example, other parameters of a battery pack charger and/or a power tool battery pack, and may transmit corresponding information to the tool electronic processor 455.

Figure 5:
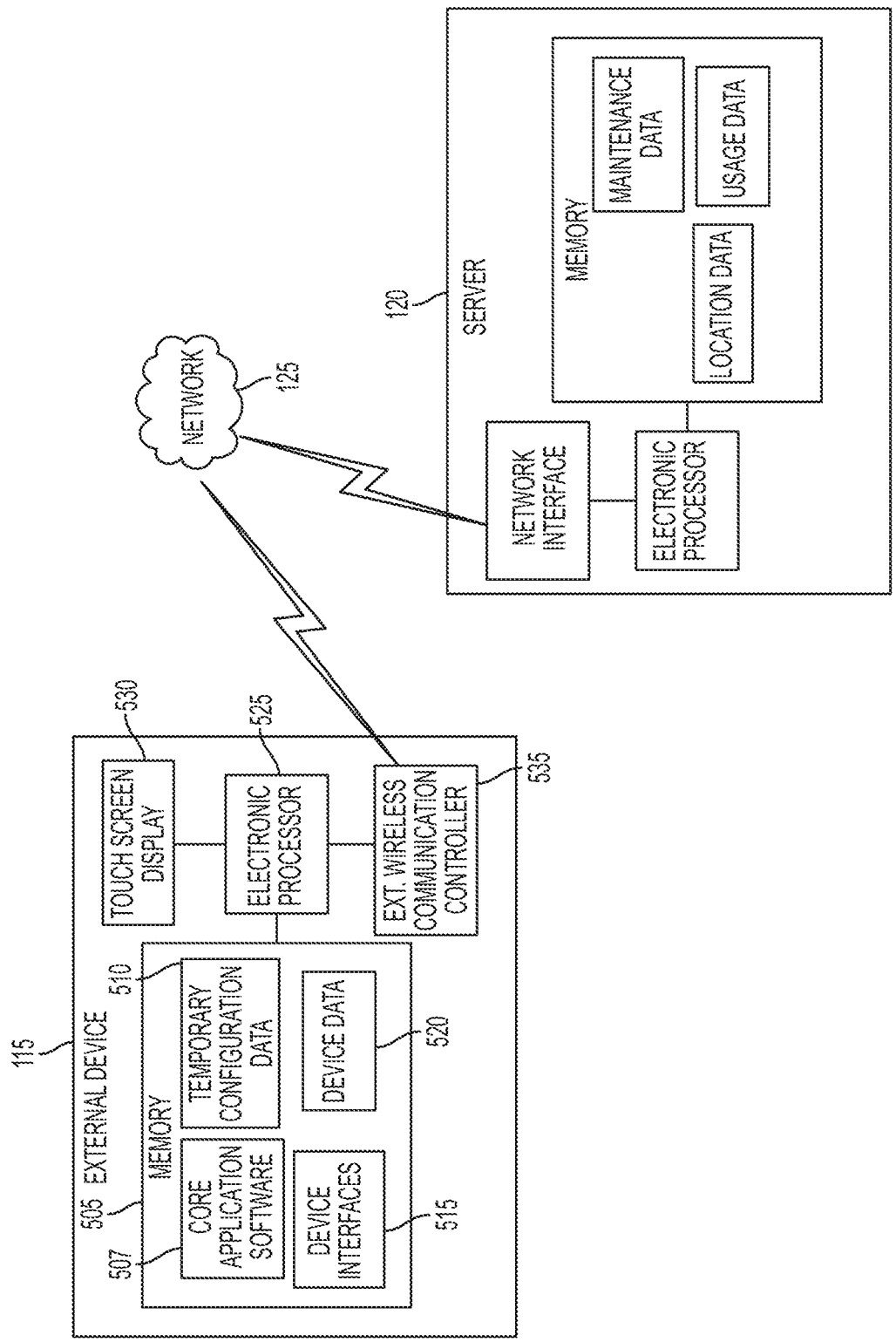
FIG. 5 is a schematic diagram of an exemplary external device of the communication system of FIG. 1.

FIG. 5 illustrates a schematic diagram of the external device 115. As shown in FIG. 5, the external device 115 includes a memory 505 storing core application software 507, temporary configuration data 510 for the light devices 105 and the power tool devices 110, device interfaces 515 (e.g., interfaces for light devices and power tool devices), device data 520 including received power tool device identifiers, light device identifiers, power tool device operational data, light device operational data, location information for light devices 105 and power tool devices 110, identification information for the light devices 105 and the power tool devices 110, and the like. The external device 115 further includes an electronic processor 525, a touch screen display 530, and an external wireless communication controller 535. The touch screen display 530 allows the external device 115 to output visual data to a user and receive user inputs. For example, the electronic processor 525 may generate a graphical user interface to display usage information for a light device 105 on the touch screen display 530. The touch screen display 530 may then also receive user inputs (e.g., through interactions with the graphical user interface), and transmit the user inputs to the electronic processor 525.

Although not illustrated, the external device 115 may include other input devices (e.g., buttons, dials, toggle switches, and a microphone for voice control) and other output devices (e.g., speakers and tactile feedback elements). Additionally, in some instances, the external device 115 has a display without touch screen input capability and receives user input via other input devices, such as buttons, dials, and toggle switches. The external device 115 communicates wirelessly with the transceiver of the light device 105 and/or the power tool device 110 via the external wireless communication controller of the external device 115, e.g., using a Bluetooth® or Wi-Fi® protocol. The external device 115 further communicates with the remote server 120 through network 125. In some instances, the external device 115 includes two separate wireless communication controllers, one for communicating with the power tool devices 110 and the light devices 105 (e.g., using Bluetooth® or Wi-Fi® communications) and one for communicating with the remote server 120 (e.g., using Wi-Fi or cellular communications).

The server 120 includes a processor that communicates with the external device 115 over the network 125 using a network interface. The communication link between the network interface, the network 125, and the external device 115 may include various wired and wireless communication pathways, various network components, and various communication protocols. The server 120 further includes a memory including a tool profile bank and tool data, as well as light identification, usage, and operational data. The server 120 provides the ability to store a larger amount of data than would be stored in the external device 115, as well as the ability for the user to access the data from a different external device 115 than the one used to transmit data to the server 120.

Figure 6:
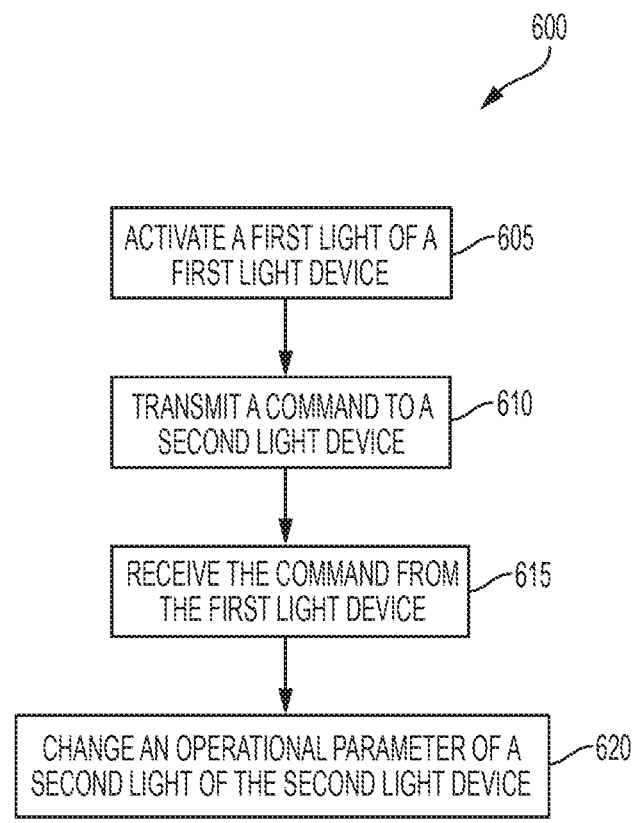
FIG. 6 is a flowchart illustrating a method of transmitting commands from a first light device to a second light device of the communication system of FIG. 1.

As discussed above, the light devices 105 form a mesh network that can be used to extend the communication range of the external device 115 by using at least some of the light devices 105 and/or the power tool devices 110 as communication bridges. FIG. 6 is a flowchart illustrating a process 600 for transmitting commands from a first device (e.g., a first light device 105*a*) to a second device (e.g., a second light device 105*b*) of the communication system 100. As discussed above, the first light device 105*a* includes a first light that is activated by the electronic processor 270 of the first light device 105*a* (step 605). The electronic processor 270 of the first light device 105*a* then transmits a command to a second light device 105*b* via a first wireless communication controller 265 of the first light device 105*a* (step 610). In the illustrated embodiment, the command instructs the second light device 105*b* to change an operational parameter of a second light of the second light device 105*b*. The wireless communication controller 265 of the second light device 105*b* receives the command from the first light device 105*a* (step 615). The electronic processor 270 of the second light device 105*b* determines that the command instructs the second light device 105*b* to change an operational parameter of the second light. The electronic processor 270 of the second light device 105*b* then changes an operational parameter of the second light in response to receiving the command through the first light device 105*a*. The operational parameter may include, for example, a pre-programmed runtime for the second light, a brightness associated with the second light, an enabled or disabled feature associated with the second light device 105*b*, a power consumption of the second light device 105*b*, an associated application for the second light device 105*b*, a combination thereof, and/or any of the parameters discussed above with respect to the exemplary light device 105. For example, in some embodiments, the command may instruct the second light device 105*a* to turn the second light on. In other embodiments, the command includes changes to multiple operational parameters. In such embodiments, the command may be referred to as new configuration data, since the second light device 105*b* is re-configured based on the received command from the first light device 105*a*.

Figure 7:
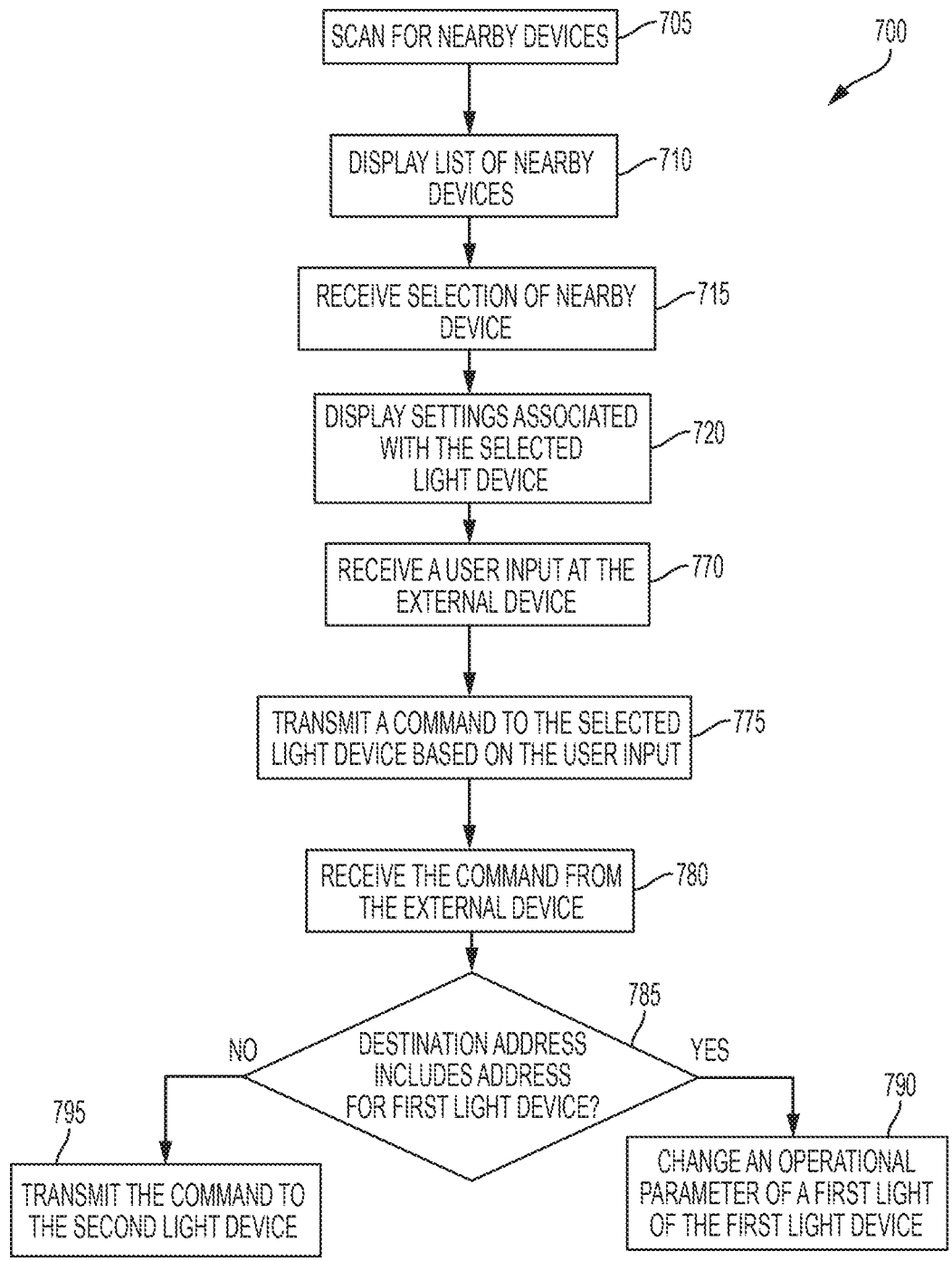
FIG. 7 is a flowchart illustrating a method for transmitting a command to a light device from an external device of the communication system of FIG. 1.
Figure 8:
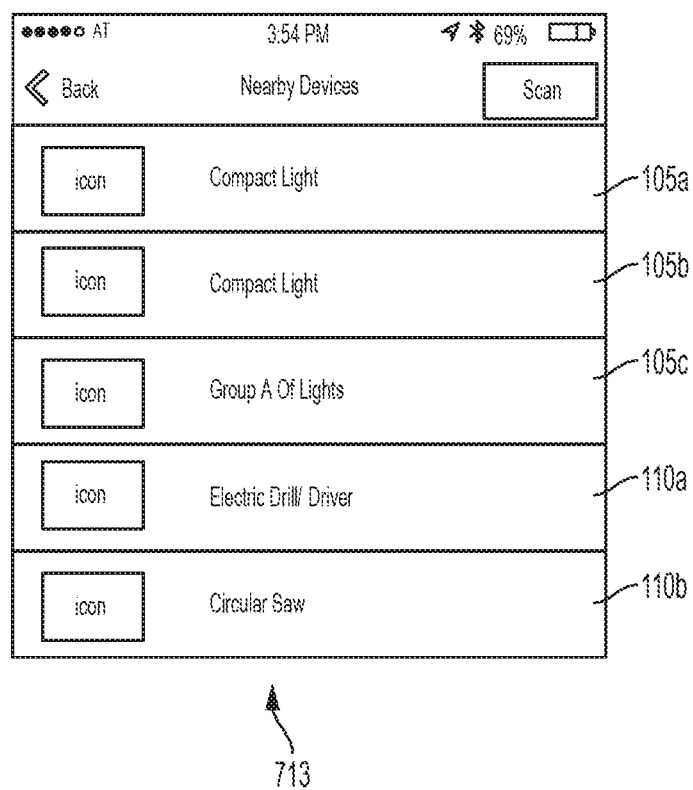
FIG. 8 illustrates an exemplary screenshot of a list of nearby devices displayed on the external device of the communication system of FIG. 1.

In some embodiments, the command from the first light device 105*a* originates at the first light device 105*a* based on a received input through, for example, the control panel 245. However, in other embodiments, the command originates from the external device 115, but uses the first light device 105*a* as a communication bridge between the external device 115 and the second light device 105*b*. FIG. 7 is a flowchart illustrating a method 700 for transmitting a command to a light device 105 from an external device 115. In the illustrated embodiment, the external device 115 performs a scan for nearby devices (step 705). The external device 115 receives an advertisement signal (e.g., an identification signal) from each nearby device in the communication system 100. The external device 115 then displays on its touch screen display 530, a list of the nearby devices (step 710). In one embodiment, the list of nearby devices only includes those devices (e.g., light devices 105 and/or power tool devices 110) that are within the direct communication range 130 of the external device 115. For example, referring back to FIG. 1, the list of nearby devices would only include the first light device 105 and the first power tool device 110*a* because the second light device 105*b* and the second power tool device 110*b* are not within the direct communication range 130 of the external device 115. In other embodiments, however, the list of nearby devices includes any device (e.g., light devices 105 and power tool devices 110) that is in communication with the external device 115 (e.g., has a communication path to the external device 115). In such embodiments, for example, the list of nearby devices would include the first light device 105*a*, the second light device 105*b*, the first power tool device 110*a*, and the second power tool device 110*b*. FIG. 8 illustrates an exemplary screenshot of a list 713 of nearby devices displayed on the external device 115. In the example of FIG. 8, the list 713 of nearby devices includes any device with which the external device 115 can establish a communication path.

The external device 115, via the touch screen display 530, receives a selection of a device from the list of nearby devices (step 715). As discussed above, the external device 115 includes a touch screen, and the selection is received by an actuation of the touch screen.

Because each device within the communication system 100 is different, may operate differently, and may include different components, the external device 115 (i.e., a device electronic processor) configures a settings screen for the selected device based on the information of the selected device. In some embodiments, the external device 115 may communicate with the server 120 to configure the settings screen for the selected device based on identification information of the selected device. In the illustrated embodiment, the selected device is a selected light device 105 (e.g., the first light device 105*a*, the second light device 105*b*, or a different light device), and a device electronic processor of the external device 115 displays settings screen associated with the selected light device 105 (step 720).

Figure 9:
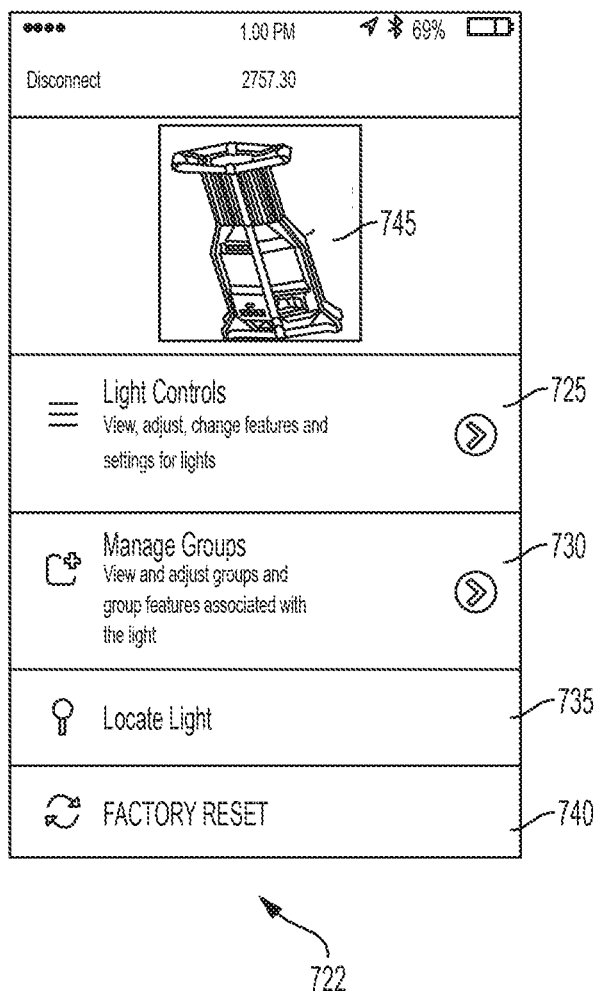
FIG. 9 illustrates an exemplary screenshot of a home screen for the first light device of the communication system of FIG. 1.

In some embodiments, a home screen for the selected device is displayed on the external device 115 before displaying the settings screen for the selected device. FIG. 9 illustrates an exemplary screenshot of a home screen 722 for the selected light device 105. As shown in FIG. 9, the home screen 722 displays options for the user to manage the interaction with the selected light device 105. For example, the home screen 722 includes a light controls option 725, a group manager option 730, a locate option 735, and a factory reset option 740. In the illustrated embodiment, the home screen 722 also includes an icon 745 for the particular device (in this example, the selected light device 105). This icon 745 may be the same icon displayed on the list 713 of nearby devices in FIG. 8. The factory reset option 740 causes the external device 115 to obtain default values for the operational parameters of the selected device (e.g., from the server 120 and/or from the selected light device 105 itself), and provides the default values to the selected light device 105, which overwrites any current values of the operational parameters for the selected light device 105 (or another selected device). The location option 735 is described in more detail below with respect to FIGS. 16-19, while the group manager option is described in more detail with respect to FIG. 11.

Figure 10:
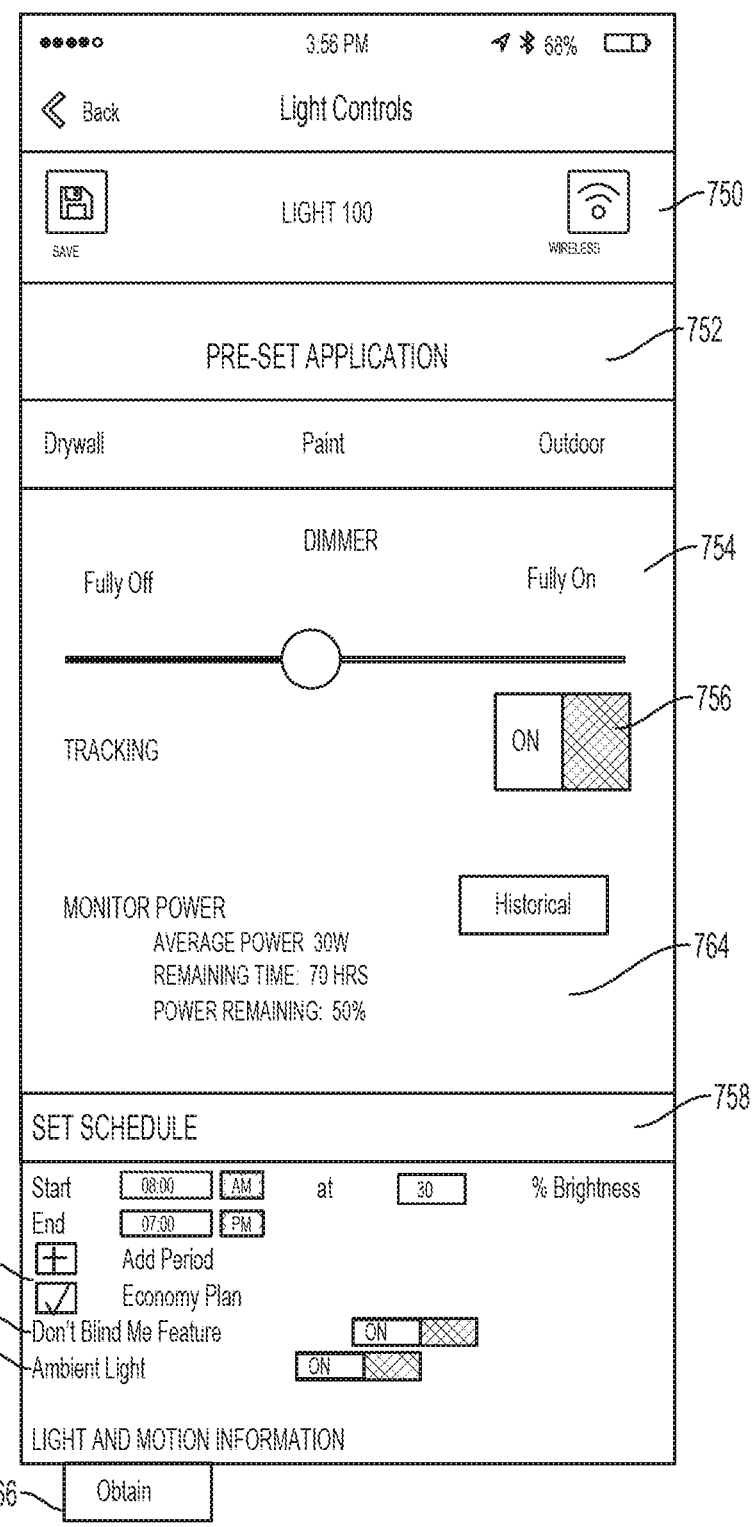
FIG. 10 is an exemplary screenshot of a settings screen for the selected light device of the communication system of FIG. 1.

When the controls option 725 is selected, a settings screen is displayed that corresponds to the selected device. In this example, a settings screen is displayed that corresponds to the selected light device 105. FIG. 10 is an exemplary screenshot of a settings screen 750 for the selected light device 105. As shown in FIG. 10, several settings are associated with the selected light device 105. For example, the exemplary settings screen 750 includes a pre-set application parameter 752, a dimmer parameter 754, a tracking feature parameter 756, a schedule parameter 758, a don't blind me feature parameter 760, and an ambient light feature parameter 762. The settings screen 750 also displays some power consumption metrics 764, and provides an option to request more information 766. Each of the parameters displayed on the settings screen 750 may be manipulated by a user. For example, a user can change the pre-set application between a drywall application, a paint application, an outdoor application, and in some embodiments, additional application options may be provided. Each application is associated with a particular brightness of the selected light device, and/or a hue or color of the selected light device. In some embodiments, each application may additionally or alternatively be associated with a particular runtime, and/or a particular power consumption.

The dimmer parameter 754 also allows a user to specify the dimming level or the brightness level for the selected light device 105. In the illustrated embodiment, a user may select, via a slider, whether the first light of the selected light device 105 is at its maximum brightness (e.g., fully on or 100% brightness), at its minimum brightness (e.g., fully off or 0% brightness), or at any other level in between. The tracking feature parameter 756 allows the user to toggle the tracking feature on and off. The tracking feature allows the selected light device 105 to operate as a tracking light and provide information to the external device 115 and the server 120 regarding the presence and/or movement of other devices within the communication network. The operation of the selected light device 105 as a tracking light is explained in more detail with reference to FIGS. 16-19.

The schedule parameter 758 allows a user to specify a particular lighting schedule for the selected light device 105. The user may specify different periods (each period including a start time and an end time) and an associated brightness or dimming level for that period. For example, FIG. 10 illustrates a period starting at 8 am and ending at 7 pm during which the selected light device 105 operates at 30% brightness. A number of different periods may be added such that the brightness level of the first light changes based on time of day. Another feature selectable for the selected light device 105 through the settings screen 750 includes an economy plan feature 759. The economy plan feature 759 controls the brightness of the light such that overall power consumption of the selected light device 105, and, in some embodiments, of the devices of the communication system 100 is reduced. This may include, for example, rotating which light devices are turned off during certain period of time, reducing overall brightness in each of the light devices 105 (e.g., decreasing brightness by 15% when an economy mode is selected), and the like.

The don't blind me feature parameter 760 allows the user to toggle the don't blind me feature on and off. When the "don't blind me" feature is enabled, the selected light device 105 detects when a headlight is focused on the selected light device 105. For example, the selected light device 105 may use one or more of the environmental sensors to detect whether additional light is pointed toward the first light device 105. When the selected light device 105 determines that additional light is pointed toward the first light device 105, and therefore a headlight is focused on the selected light device 105, the selected light device 105 automatically lowers its brightness level to inhibit blinding a person using a headlight that is pointed toward the selected light device 105. In some embodiments, the first light device 105 (e.g., the electronic processor 270 of the selected light device 105) determines that a headlight is pointed toward the selected light device 105 when a light sensor detects a higher than normal brightness at the selected light device 105.

The ambient light feature parameter 762 allows the user to toggle the ambient light feature on and off. When the "ambient light" feature is enabled, the selected light device 105 (i.e., the electronic processor 270 of the selected light device 105) detects when an amount of ambient light increases and decreases and changes the brightness of the first light of the selected light device 105 correspondingly. For example, when the electronic processor 270 of the selected light device 105 detects that the ambient light is above a predetermined high ambient light threshold, the electronic processor 270 of the selected light device 105 decreases the brightness of the first light by approximately 50%. On the other hand, when the electronic processor 270 of the selected light device 105 detects that the ambient light is below a predetermined low ambient light threshold, the electronic processor 270 of the selected light device 105 increases the brightness of the first light by approximately 50%. When the ambient light is between the low ambient light threshold and the high ambient light threshold, the electronic processor 270 of the selected light device 105 may linearly change the brightness of the first light inversely proportional to the ambient light detected by the electronic processor 270 of the selected light device 105. The ambient light feature may provide some power savings as well as providing an ability to maintain a relatively even level of brightness by compensating for the outdoor environment.

As shown in FIG. 10, the settings screen 750 may also provide the user with the opportunity to obtain further information regarding the selected light device 105. For example, the settings screen 750 displays the power consumption metrics 764 including an average power consumption of the selected light device 105, an estimate of the remaining runtime, and an estimate of the remaining power of a battery pack coupled to the selected light device 105 (e.g., the state of charge of a battery pack coupled to the selected light device 105). In other embodiments, more, less, or different power consumption metrics may be displayed to the user to provide some feedback regarding the power consumption of the selected light device 105. In the illustrated embodiment, the settings screen 750 also includes an option to obtain further historical power consumption information for the selected light device 105. More information regarding the selected light device 105 and/or motion detected by the selected light device 105 may be requested by the user by actuating the obtain more information actuator 766.

The external device 115 may directly control the selected light device 105 by toggling the selected light device 105 on/off. In some applications and/or circumstances, the external device 115 receives a user input indicating that the selected light device 105 is to flash, for example, three times. Users near the selected light device 105 may have been previously trained to know that flashing of the selected light device was indicative of a particular event. For example, in some situations, the flashing of a selected light device 105 may indicate that an assembly line is starting or stopping soon, that a security alarm was enabled, and the like.

Referring pack to FIG. 7, a user may select to change any (or combinations of) the parameters described above with reference to FIG. 10. When a user selects one or more parameters to change, the external device 115 (i.e., the electronic processor of the external device 115) receives the user inputs (step 770). In response to receiving the user input indicating the changed parameter(s), the external device 115 transmits a command to the selected light device 105 based on the user input(s) received at the external device 115 (step 775). The command transmitted by the external device 115 includes a destination address that corresponds to the address of the selected light device 105. Since the first light device 105*a* is within the communication range of the external device 115, the first light device 105*a* receives the command for the selected light device 105 (step 780). In some embodiments, the external device 115 transmits the command to one or more of the devices (e.g., light devices 105 and/or power tool devices 110) that are within the direct communication range of the external device 115, and allows the mesh network of the communication system 100 to deliver the command to the selected light device 105.

In other embodiments, however, the external device 115 first determines whether the selected light device 105 is within the direct communication range of the external device 115. When the selected light device is within the communication range of the external device 115, the external device 115 sends the command directly to the selected light device 105. On the other hand, when the external device 115 determines that the selected light device 105 is not within the direct communication range of the external device 115, the external device 115 sends the command to a light device 105 within its communication range. In this example, the external device 115 sends the command to the first light device 105*a* because the first light device 105*a* is within the communication range of the external device 115.

The electronic processor 270 of the first light device 105*a*, upon receiving the command, determines whether the destination address of the received command from the external device 115 includes the address of the first light device 105*a* (step 785). In other words, the first light device 105*a* determines whether the command from the external device 115 is for the first light device 105*a*. When the electronic processor 270 of the first light device 105*a* determines that the destination address includes the address of the first light device 105*a* (e.g., the selected light device 105 is the first light device 105*a*), the electronic processor 270 of the first light device 105*a* changes the operational parameter of the first light based on the command received from the external device 115 (step 790). On the other hand, when the electronic processor 270 of the first light device 15*a* determines that the destination address does not include the address of the first light device 105*a* (e.g., the selected light device 105 is not the first light device 105*a*, but a different light device 105), the wireless communication controller 265 of the first light device 105*a* forwards the command to the second light device 105*b* (step 795). The second light device 105*b*, then receives the command, and determines whether the destination address includes the address of the second light device 105*b*. Such a forwarding process continues until the command reaches the selected light device 105. The light devices 105 of the communication system 100 may implement different routing algorithms to decide where to forward wireless messages when the receiving light device 105 is not included in the final destination of a wireless message.

FIGS. 6 and 7 were described assuming that both communicating devices included light devices 105. However, in some embodiments, the external device 115 may be used to change and/or re-configure a selected power tool device 110. The external device 115 may generate a separate settings screen (or control screen) for each power tool device 110 that conforms to the features available for the particular power tool device 110. Additionally, a power tool device 110 could also substitute the first light device 105*a* and/or the second light device 105*b* described with respect to FIG. 6. In other words, a first light device 105*a* may send a command to a power tool device 110 (e.g., using the first light device 105*a* as a communication bridge), a power tool device 110 may send a command to a second light device 105*b* (e.g., using the power tool device 110 as a communication bridge), and/or a first power tool device 110*a* may send a command to a second power tool device 110*b*. Although not shown, parameters such as rotating speed, applied torque, rotation direction, number of impacts, provided current and more may be customizable for a power tool device 110 through a settings screen displayed on the external device 115. Light devices 105 and/or other power tool devices 110 may then be used as communication bridges between the external device 115 and a selected power tool device 110.

In some embodiments, a plurality of light devices 105 may be grouped together (e.g., by a user or by default) such that changes to the operational parameter(s) affect each light device 105 in the group of the light devices 105. Referring back to FIG. 9, the group manager option 730 allows a user to group and re-group different number of light devices 105 such that they can be controlled simultaneously. The similar parameters are available to a group of light devices 105 than to a single light device 105. When the external device 115 receives a user input indicating changes to an operational parameter of the group of light devices 105, the external device 115 may send a command directly to each of the light devices 105 within the group of light devices 105. In other embodiments, however, the external device 115 transmits the command to a single light device 105 within its communication range, and the command reaches each of the light devices 105 in the group through the mesh network.

Figure 11:
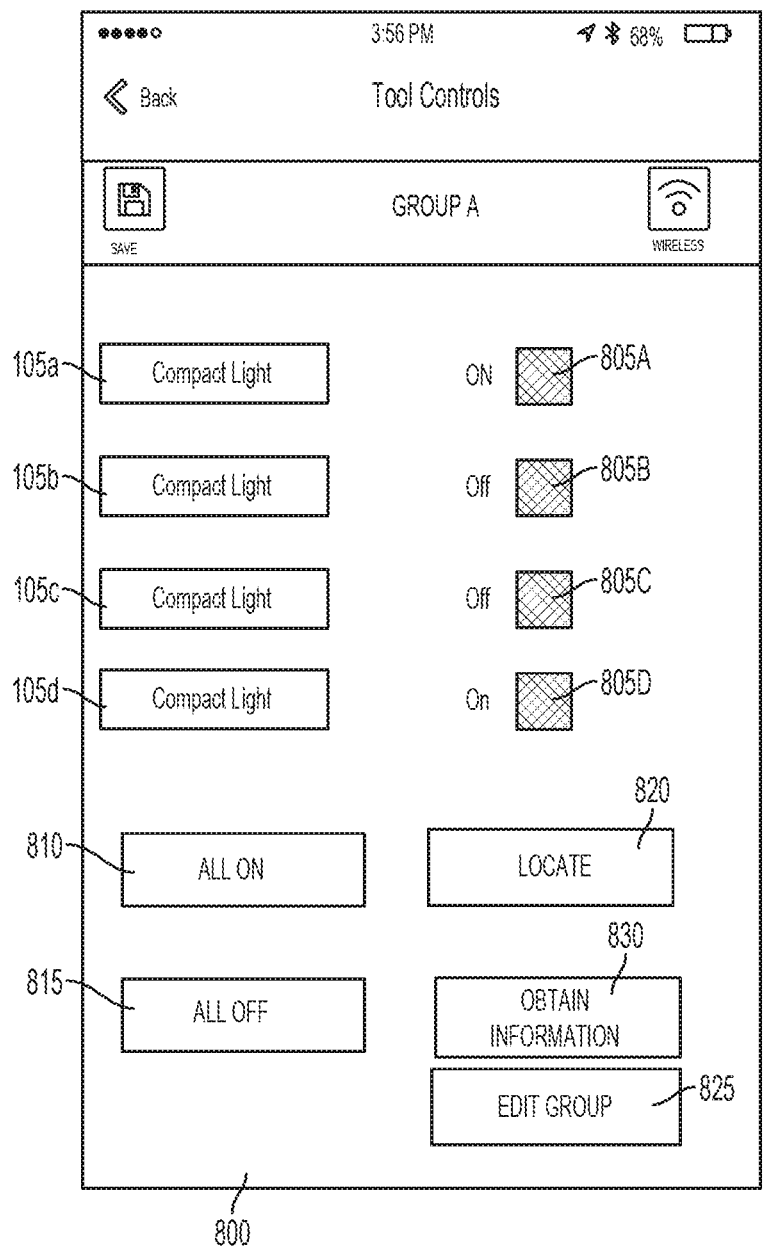
FIG. 11 is an exemplary screenshot of a control screen for a group of light devices of the communication system of FIG. 1.
Figure 12:
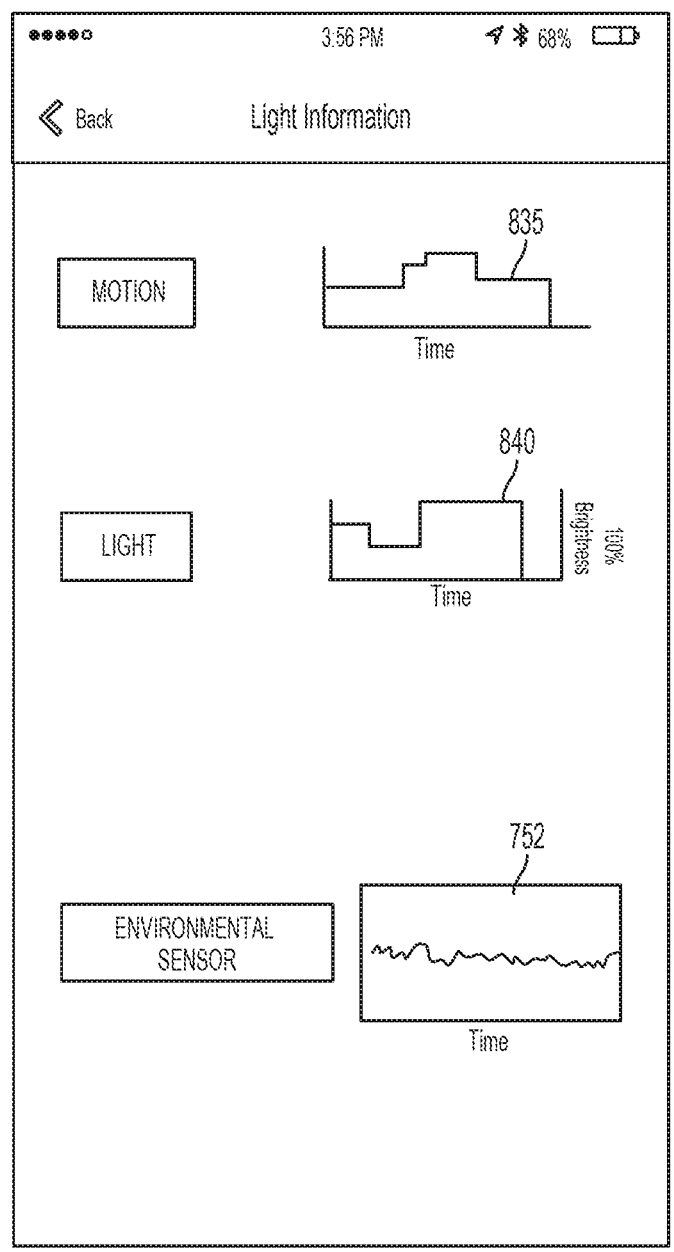
FIG. 12 illustrates an exemplary screenshot of additional information available for at least one of the light devices of a group of light devices of the communication system of FIG. 1.

FIG. 11 is an exemplary screenshot of a control screen 800 for a group A of light devices 105a-d. The groups may be based on, for example, the energy source for the light devices 105 (e.g., a set of light devices may share the same power source). The power source may include a battery, an AC outlet, a power tool battery pack, and the like. The control screen 800 includes on/off actuators 805a-d for each of the light devices 105a-d in the group A to turn on/off each of the light devices 105a-d individually. The control screen 800 also provides an "all on" control 810, and an "all off" control 815 to control all of the light devices 105a-d in the group simultaneously. Additionally, a locate option 820 is available and may provide location information for one or more of the light devices 105a-d of the group A, as described in more detail below with reference to FIGS. 16-19. The group A of light devices 105a-d may also be edited by selecting the "edit group" option 825. By activating the "edit group" option, specific light devices 105a-d may be added and/or deleted from the group A. Additional information may also be requested from the light devices 105a-d and/or from the server 120 through the "obtain information" option 830. FIG. 12 illustrates an exemplary screenshot of additional information available for at least one of the light devices 105 of the group A. As shown in FIG. 12, the external device 115 may display a motion graph 835 that provides information regarding motion detected by the motion sensor 250 of a light device 105, as well as a brightness graph 840 that displays the relative brightness provided by the light device 105 throughout the day. In the illustrated embodiment, the external device 115 also displays an environmental data graph 845 depicting values obtained from the environmental sensor 257 of a light device 105. The external device 115 may obtain the shown information by communication directly from the light device 105, or may request the information from the server 120.

Figure 13:
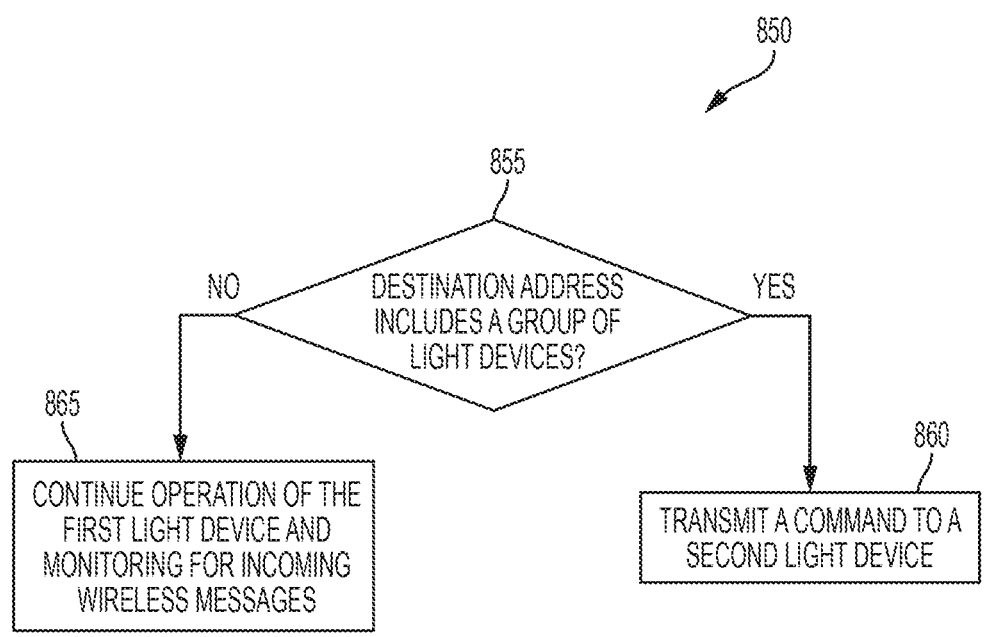
FIG. 13 is a flowchart illustrating a method of forwarding commands to a group of light devices of the communication system of FIG. 1.

FIG. 13 is a flowchart illustrating a method 850 of forwarding commands to a group of light devices 105. The flowchart of FIG. 13, follows, for example, from step 790 of FIG. 7. After the first light device 105a receives the command from the external device 115 because the destination address includes the address of the first light device 105a (step 790 of FIG. 7), the electronic processor 270 of the first light device 105a determines whether the destination address includes a group of light devices (e.g., instead of only the address of the first light device 105a) at step 855. When the destination address includes a group of light devices 105, the wireless communication controller 265 of the first light device 105a forwards the command to the second light device 105b. The second light device 105b may then have to determine whether the destination address of the command includes the address of the second light command (step 860). However, when the destination address does not include a group of light devices 105 (e.g., and the command was instead directed only at the first light device 105a), the first light device 105a continues operation of the first light device 105a and continues monitoring for incoming wireless messages from other devices within the communication system 100 (step 865).

Figure 14:
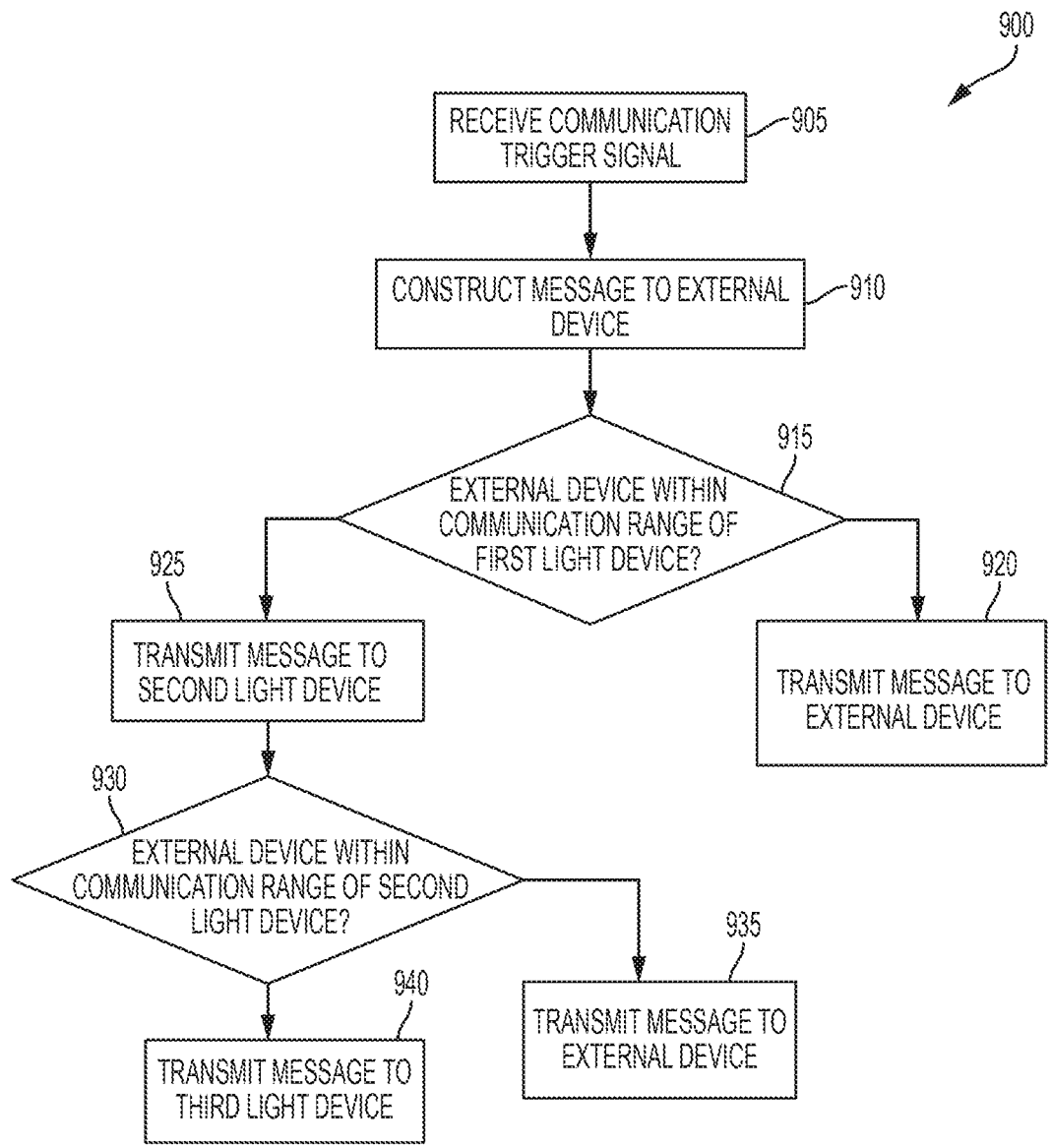
FIG. 14 is a flowchart illustrating a method of transmitting a message to the external device from another device of the communication system of FIG. 1.

FIGS. 6-13 illustrate methods and screenshots related to using an external device 115 to reconfigure and/or change operational parameters of the light devices 105. Communication with the external device 115 by the light devices 105, however, is also useful to access operational information (e.g., metrics) regarding the light devices 105 and/or power tool devices 110. FIG. 14 is a flowchart illustrating a method 900 of transmitting a message to the external device 115 from a device (e.g., a light device 105 and/or a power tool device 110) of the communication system 100. In the example of the method 900, the first light device 105 sends the message to the external device 115. In other embodiments and/or examples, other devices in the communication system 100, such as, other light devices 105 and/or power tool devices 110, may send the wireless message to the external device 115. First, the electronic processor 270 of the first light device 105a receives a communication trigger signal (step 905). A communication trigger signal represents a signal that upon receipt is to be communicated to the external device 115. A communication trigger signal may be an external signal received from a different light device 105 and/or power tool device 110, or may be an internal signal generated by the first light device 105 itself. For example, an external signal may include a wireless message received from another light device 105 or power tool device 110 (e.g., from the second light device 105b) and that includes the address of the external device 115 as its destination address. Therefore, when the first light device 105a receives a message directed to the external device 115 (or another device in the communication system 100), the message is considered a communication trigger signal because it triggers the first light device 105a to transmit a wireless message to another device and/or the external device 115.

In another example, the internal communication trigger signal may include a determination by the electronic processor 270 of the first light device 105a that an output from a sensor 250, 255, 257, 260 exceeds a predetermined sensor alert threshold. In such embodiments, the electronic processor 270 of the first light device 105a may automatically generate an alert message to the external device 115 indicating that a particular parameter (e.g., an environmental parameter) exceeds an expected value and/or range. In particular, when the power sensor 260 detects that AC power to the first light device 105a has been interrupted, the electronic processor 270 of the first light device 105a prepares an alert message to the external device 115 that AC power has been interrupted at the first light device 105a. In another example, the motion sensor may detect motion (or repeated motion) near the first light device 105a, which may prompt the electronic processor 270 of the first light device 105a to prepare a different alert message to the external device 115. In some embodiments, the light device 105 communicates with the external device 115 when a battery pack needs replacement and/or when a battery is fully charged. Other internal or external signals that prompt the electronic processor 270 of the first light device 105a to prepare a message to the external device 115 may be considered communication trigger signals. In some embodiments, a communication trigger signal may additionally trigger a change in the operation of the device. For example, when the power sensor 260 of a light device 105 indicates that AC power has been lost, the brightness level of the light is automatically reduced in response to the output from the power sensor 260. In another example, when a light device 105 detects a power tool device 110 within a specified proximity range, the light device 105 may automatically (e.g., in response to detecting the proximity to the power tool device 110) activate its light and/or direct the light toward the direction in which the power tool device 110 is located relative to the light device 105.

After the electronic processor 270 of the first light device 105a receives the communication trigger signal, the electronic processor 270 of the first light device 105a constructs an appropriate wireless message to the external device 115 (step 910). The content of the wireless message is based on the communication trigger signal. For example, when the communication trigger signal includes a wireless message received from another device (e.g., the second light device 105b) in the communication system 100, the wireless message to the external device 115 includes the original wireless message (e.g., from the second light device 105b). In a different example, when the communication trigger signal includes an indication that an environmental sensor 257 of the first light device 105a detects an environmental parameter (e.g., carbon monoxide concentration) to be above the predetermined threshold, the wireless message to the external device 115 includes an indication of which environmental parameter is outside an expected range. The wireless communication controller 265 of the first light device 105a then determines whether the external device 115 is within the communication range of the first device 105a (step 915). When the external device 115 is within the direct communication range of the first device 105a, the wireless communication controller 265 of the first light device 105a transmits the message to the external device 115 directly (step 920). On the other hand, when the external device 115 is not within the direct communication range of the first light device 105a, the wireless communication controller 265 of the first light device 105a transmits the message to the second light device 105b including instructions (e.g., a destination address) that specify that the wireless message is directed to the external device 115 (step 925).

The second light device 105b then receives the wireless message, and determines whether the external device 115 is within the direct communication range of the second light device 105b (step 930). Although not shown, in some embodiments, the second light device 105b also determines whether the destination of the wireless message includes the address of the second light device. Since the destination address of the wireless message does not include the address of the second light device, the electronic processor 270 of the second light device 105 proceeds to determining whether the external device 115 is within the direct communication range of the second light device 105b.

Figure 15:
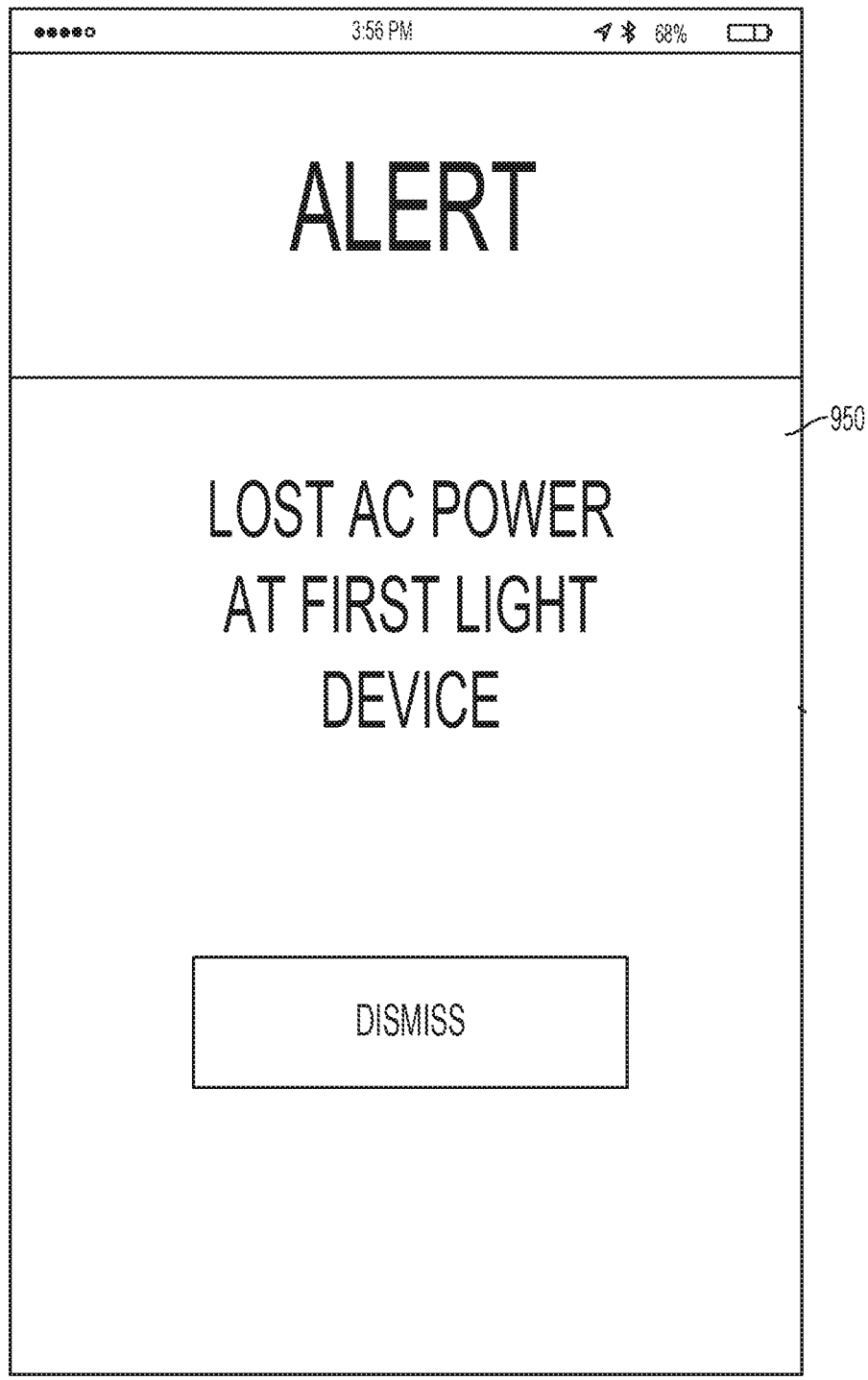
FIG. 15 illustrates an exemplary screenshot of an alert message sent to the external device from the first light device of the communication system of FIG. 1.

When the external device 115 is within the direct communication range of the second light device 105b, the wireless communication controller 265 of the second light device 105b transmits the message to the external device 115 (step 935). On the other hand, when the second light device 105b is still outside the direct communication range of the external device 115, the second light device 105b (e.g., the communication controller 265 of the second light device 115) transmits the wireless message to a third light device in an attempt to reach the external device 115 (step 940). Therefore, when a light device 105 is within the direct communication range of the external device 115, the light device 105 forwards the wireless message to the external device 115. FIG. 15 illustrates an exemplary screenshot of an alert message 950 sent to the external device 115 from the first light device 105a. The alert message 950 indicates that AC power was lost at the first light device 105a (e.g., the communication trigger signal was caused by the power sensor 260).

Figure 16:
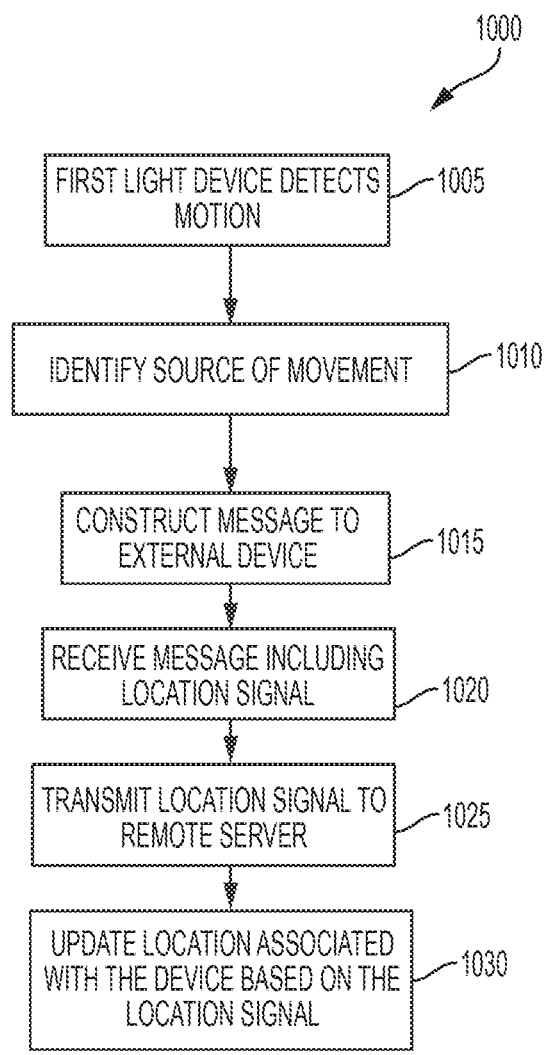
FIG. 16 is a flowchart illustrating a method of updating the external device regarding motion detected by a light device of the communication system of FIG. 1.

FIG. 16 is a flowchart illustrating a method 1000 of updating the external device 115 regarding motion detected by a light device (for example, the first light device 105a). First, the first light device 105a detects motion within a proximity range of the first light device (step 1005). The first light device 105a then determines the source of the movement (step 1010). In particular, the electronic processor 270 of the first light device 105a determines whether the detected motion is, for example, from a nearby power tool device 110 and/or from a nearby external device 115. After the electronic processor 270 of the first light device 105a identifies the source of movement, the electronic processor 270 of the first light device 105a constructs the message to the external device 115 including a location and/or movement signal (step 1015). As discussed above, in some embodiments, detection of motion at the first light device 105a also prompts the electronic processor 270 of the first light device 105a to change a parameter of the first light device 105a. In one embodiment, when a light device 105 detects a power tool device 110 within a specified proximity range, the light device 105 may automatically (e.g., in response to detecting the proximity to the power tool device 110) activate its light and/or direct the light toward the direction in which the power tool device 110 is located relative to the light device 105.

The location and/or movement signal includes an indication of the location of the first light device 105a and an indication of the power tool device 110 and/or the external device 115 located proximate to the first light device 105a. In some embodiments, the location of the first light device 105a is obtained through the location unit 255. In other embodiments, the location of the first light device is a relative location that indicates the location of the first light device 105a relative to other light devices in the communication system 100. The external device 115 receives the wireless message including the location and/or movement signal (step 1020), and transmits the location and/or movement signal to the remote server 120 (step 1025).

The remote server 120 stores, among other things, a most recent location for each of the devices in the communication system 100. For example, the remote server 120 may include a database in which the location of the light devices 105 and the power tool devices 110 is updated periodically. When the remote server 120 receives the location and/or movement signal from the external device 115, the remote server 120 updates the location associated with the light device 105 or the power tool device 110 detected by the first light device 105a (step 1030). Thereby, the different light devices 105 may serve to continuously track the power tool devices 110, other light devices 105, and/or the external devices 115 that are part of the communication system 100. In some embodiments, by monitoring the location of the power tool devices 110 and/or the external devices 115, the communication system 100 may also be able to monitor the well-being of its users. For example, if a particular user is associated with a first external device 115 and a nearby light device 105 detects that the first external device 115 has not changed location in more than, for example, three hours, the nearby light device 105 may transmit an alert signal to another external device 115 indicating that a particular user may need assistance.

Referring back to step 1005 of FIG. 16, the first light device 105a may detect motion using different methods. For example, in one embodiment, the first light device 105a detects the motion through the motion sensor 250. In response to the motion detected by the motion sensor 250, the electronic processor 270 of the first light device 105a performs a scan of nearby devices to determine whether a power tool device 110, another light device 105, and/or an external device 115 are located nearby. In some embodiments, the first light device 105a may establish communication links with the nearby devices to monitor the received signal strength to determine which, if any, of the nearby devices generated the motion signal. In other embodiments, the first light device 105a (and at least some other light devices) perform a scan of the nearby devices. The first light device 105a then receives identification signals from each of the nearby devices 105, 110, 115. The first light device 105a then periodically repeats the scan (e.g., approximately every hour) and transmits the information regarding the nearby devices to the external device 115 on every scan. Therefore, when a particular power tool device 110, for example, is first detected by the first light device 105a, 30 minutes later by a second light device 105b, and 60 minutes later by a third light device 105, the electronic processor of the external device 115 and/or an electronic processor at the server 120 may determine a movement path (directional motion) of the power tool device 110. In some embodiments, if the movement path of the power tool device 110 seems unexpected (e.g., traveling quickly away from the worksite), the first light device 105a may send an alert signal to the external device 115. At least some of the light devices 105 may operate as a tracking light and may move (e.g., with a small motor of the light device 105) in accordance to movement sensed within the particular room such that light is directed toward the source of motion.

Figure 17:
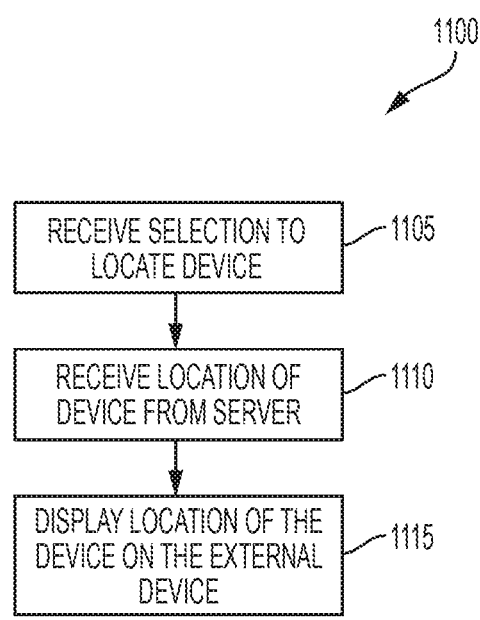
FIG. 17 is a flowchart illustrating a method of requesting location information for a device of the communication system of FIG. 1.
Figure 19:
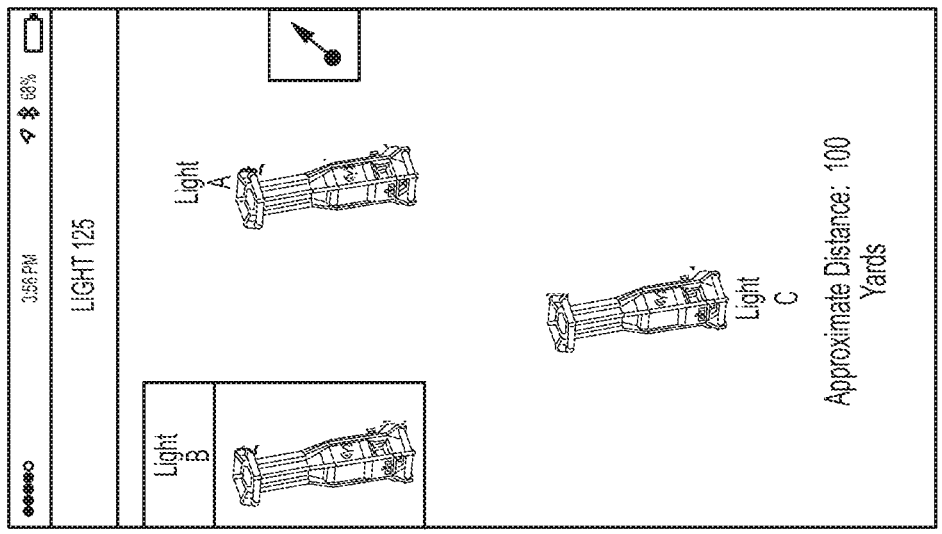
FIGS. 18-19 illustrate exemplary screenshots of mappings providing information regarding a location of a selected power tool devices and/or light devices of the communication system of FIG. 1.
Figure 18:
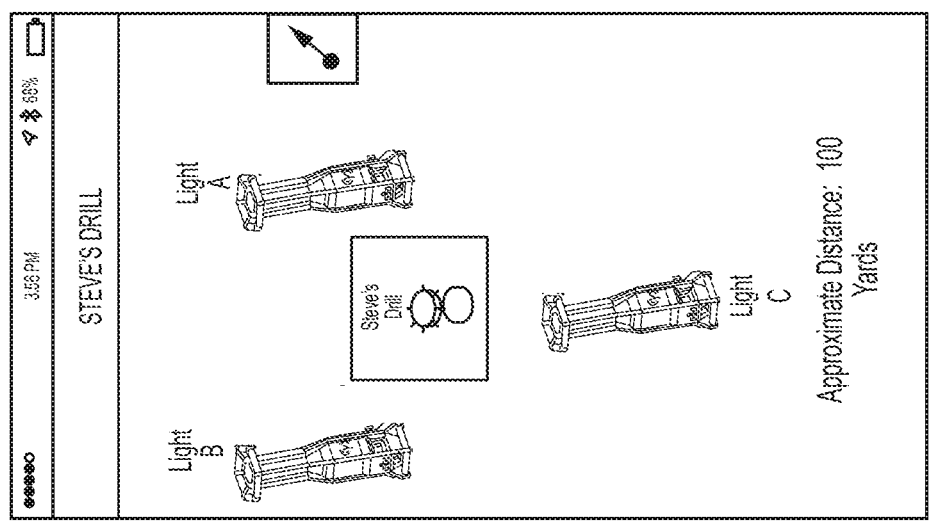

As suggested in FIGS. 9-11, the external device 115 may also be used to request some information regarding the location of the power tool devices 110, the light devices 105, and/or the external devices 115. FIG. 17 is a flowchart illustrating a method 1100 of requesting location information for a device (e.g., a power tool device, a light device 105, and/or an external device 115) of the communication system 100. As shown in FIG. 17, the external device 115 receives a selection to locate a power tool device 110 and/or a light device 105 (step 1105). As shown in FIGS. 9-11, the request to locate a power tool device 110 and/or a light device 105 may be received from different screens displayed by the external device 115. The external device 115 may then communicate with the server 120 and may receive a location signal from the server 120 (step 1110). The external device 115 then generates a map display based on the received location signal (step 1115). FIGS. 18 and 19 illustrate exemplary screenshots of mappings provided to provide the user with information regarding the location of the selected power tool devices 110 and/or light devices 105. As shown in FIGS. 18 and 19, the mapping also provides an indication of the direction of where the power tool device 110 (FIG. 18) and/or the light device 105 (FIG. 19) with respect to either the current location of the external device 115 and/or the location of the nearest light device 105 and/or power tool device 110.

In some embodiments, the external device 115 does not access the server 120 to obtain the location information. Rather, the external device 115 sends a communication signal to one of the power tool devices and the light devices 105. Due to the mesh network configuration of the communication system 100, the request for the location of a particular power tool device 110 is propagated through the mesh network. When the particular power tool device 110 is found, a notification may, in some embodiments, be provided to the external device 115. In some embodiments, selecting the locate option 735 sends a command to the paired light device (e.g., the first light device 105a) requesting that the paired device provides a user-perceptible indication, such as flashing a light, lighting a different indicator or LEDs, making a sound. In some embodiments, the external device 115 may receive more than one indication that the power tool device 110 has been located (e.g., if the power tool device 110 is in the communication range of more than one light device 105) and may determine at least a relative position of the power tool device 110 based on the information received from the light devices 105 (e.g., through triangulation).

In some embodiments, some of the light devices 105 are grouped together when they are associated with a particular egress. These light devices 105 may remain on at a non-zero brightness level regardless of the surrounding conditions to continue to illuminate the egress. These light devices 105 may also flash to indicate a path direction of egress. The light devices 105 can also respond to proximity signals. For example, if the light device 105 detects that a user is nearby, the light device 105 powers one. When the user is no longer within range (or within a specific area), the light device powers off. In some embodiments, the light devices 105 include tracking lights that move a lighting head in the direction of movement or detected proximity. In some embodiments, the tracking lights may alternatively or additionally change the intensity of the bulbs in the direction of movement or detected proximity.

FIG. 20 illustrates an exemplary screenshot of an alternative settings screen 1150 for a light device 105 of the communication system 100. Similar to the setting screen 750 of FIG. 10, the settings screen 1150 of FIGS. 20A and 20B illustrate different parameters associated with the light device 105 that may be controlled by a user through the graphical user interface generated by the external device 115. As shown in FIG. 20A, the setting screen 1150 includes an on/off toggle 1153, a battery state indicator section 1156, an alert section 1159, and a brightness/runtime selector 1162. The on/off toggle 1153 allows a user to remote control whether the light device 105 is turned on or off. The on/off toggle 1153 moves between two positions: an on position and an off position. The on/off toggle 1153 is in the off position in FIG. 20A and in the on position in FIG. 20B. The graphical user interface provides an indication (e.g., a green colored light) when the on/off toggle 1153 is in the on position, so the user can easily identify the current state of the light device 105.

The battery state indication section 1156 provides information regarding the current state of charge of the battery packs connected to the light device 105. In the illustrated embodiment, the battery state indication section 1156 includes a battery icon 1164a-b for each battery pack connected to the light device 105. Each battery icon 1164a-b may indicate the state of charge for a battery pack connected to the light device 105. In some embodiments, the battery icons 1164a-b may change colors and may be filled to different levels based on the current state of charge. The graphical representation allows a user to quickly determine the battery state of the light device 105. The alert section 1159 provides information regarding abnormal conditions of the light device 105. In the illustrated embodiment, the alert section 1159 displays an alert regarding an abnormal condition for a battery pack connected to the light device. In other embodiments, however, the alert section 1159 may be related to other types of abnormal conditions such as, for example, a light 220 that is not working.

The brightness/runtime selector 1162 allow a user to select a brightness or a runtime and provides a corresponding runtime or brightness, respectively. As shown in FIG. 20A, when the light device 105 is off, the brightness/runtime selector 1162 is deactivated. The settings screen 1150, however, displays instructions to turn the light device 105 on if the brightness/runtime selector 1162 is desired. FIG. 20B illustrates another instance of the settings screen 1150 in which the on/off toggle 1153 indicates that the light device 105 is activated, and the brightness/runtime selector 1162 is enabled. As shown in FIG. 20B, the brightness/runtime selector 1162 includes a parameter selector 1165*a*, a slider 1165*b*, and an indicator 1165*c*. The parameter selector 1165*a* toggles between brightness (or illumination level) and time to indicate which parameters may be controlled other than the parameter currently controlled by the brightness/runtime control 1165. For example, in the example of FIG. 20B, the brightness parameter is selected to be controlled. The parameter selector 1165*a* indicates "time" because an approximate runtime is the other parameter that may be controlled other than brightness, which corresponds to the parameter currently controlled by the brightness/runtime control 1165. The slider 1165*b* includes two ends indicating two extremes of the controlled parameter. In the example of FIG. 20B, the controlled parameter is brightness, so a first end of the slider 1165*b* corresponds to 0% brightness (e.g., light device 105 off) and a second, opposite end of the slider 1165*b* corresponds to 100% brightness (e.g., light device 105 fully on). When the controlled parameter is runtime, the first end of the slider 1165*b* may correspond to a runtime of zero minutes (e.g., light device 105 off) and the second end of the slider 1165*b* may correspond to a maximum runtime associated with the light device 105. The indicator 1165*c* is movable along the slider 1165*c* to indicate a desired value for the controlled parameter (e.g., selects a desired brightness). The settings screen 1150 updates based on the desired value for the controlled parameter and displays a calculated parameter (e.g., an estimated runtime in the example of FIG. 20B). The user may then have a reasonable approximation of how long the light device 105 is expected to be activated and at what brightness.

In other embodiments, the brightness/runtime control may include different selection mechanisms in addition to or instead of the slider shown in FIG. 20B. For example, in some embodiments, the brightness/runtime control 1165 may provide a dropdown menu for a user to select a particular level of brightness or a runtime. The dropdown menu may present preset options. For example, a user may select a level of brightness from a dropdown menu presenting ten options such as, for example, 10%, 20%, 30%, 40%, 50%, and the like. In other embodiments, the brightness/runtime control 1165 may allow a user to directly input the desired level of brightness and/or the desired runtime. For example, a user may be able to input a desired level of brightness of 37%, and/or a runtime of 2 hours and 43 minutes. In other embodiments, the brightness/runtime control 1165 may change based on which parameter is selected by the user. For example, when a user indicates a desired brightness, the slider may be displayed, but when a user indicates a desired runtime, a dropdown menu with different timing options may be displayed.

In the illustrated embodiment, the settings screen 1150 also includes an alert settings 1168. The alert settings 1168 may indicate, for example, what type of alerts are desired by the user, and may be able to tailor the alerts based on personal preferences of the users. In the illustrated embodiment, the alert settings 1168 allow a user to specify when to be alerted that the light device 105 is expected to deactivate. In the illustrated embodiment, a selection of 30 minutes indicates that 30 minutes before the light device 105 is expected to deactivate, an alert is generated by the external device 115 to indicate that in approximately 30 minutes, the light device 105 was expected to be deactivated. Other types of alerts may be configured under the alert settings 1168.

Figure 21:
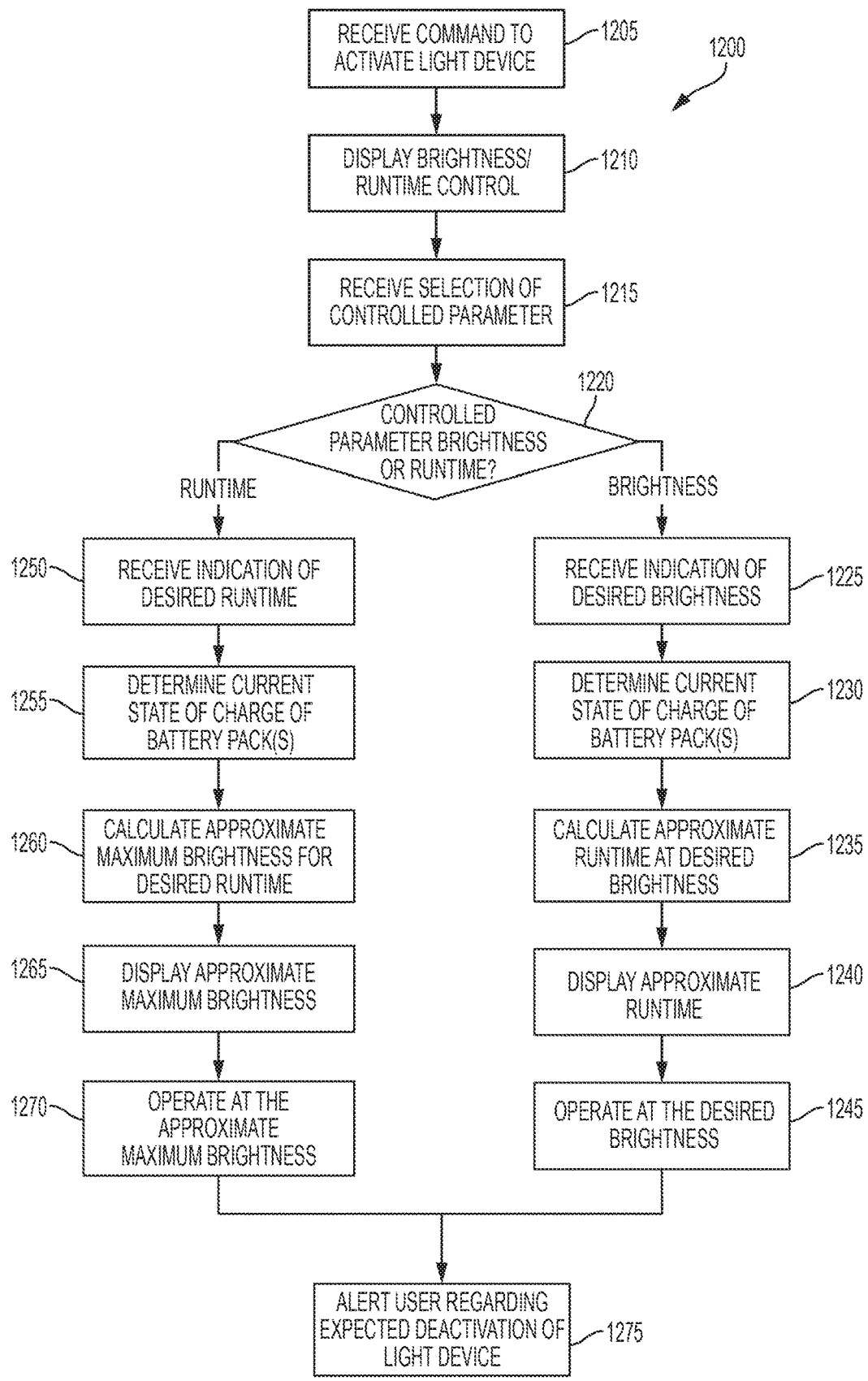
FIG. 21 is a flowchart illustrating a method of programming future operation of a light device of the communication system of FIG. 1.

FIG. 21 is a flowchart illustrating a method 1200 of programming future operation of a light device 105 using the brightness/runtime selector 1162. As shown in FIG. 21, the external device 115 first receives an command to activate the light device 105 (step 1205). The external device 115 receives the command through the on/off toggle 1153 as shown in FIG. 20B. In response to receiving the command to activate the light device 105, the external device 115 displays a brightness/runtime control 1165 (FIG. 20B) as part of the brightness/runtime selector 1162 (step 1210). The external device 115 then receives a selection of the controlled parameter (step 1215) through the parameter selector 1165*a*. As discussed above, in the example of FIG. 20, the selected controlled parameter is brightness (e.g., level of illumination). The external device 115 then determines whether the controlled parameter corresponds to brightness or runtime (step 1220). In some embodiments, the external device 115 does not allow a user to determine which parameter is controlled. Rather, the external device 115 may simply allow a user to change one of the parameters (e.g., brightness or runtime). In such embodiments, steps 1215 and 1220 are bypassed by the external device 115. The external device 115 may then also only perform steps 1225-1245 or steps 1250-1270 depending on which parameter is able to be controlled by the user.

When the selected controlled parameter is brightness, the external device 115 proceeds to operate the light device at a desired brightness for an approximated run time (steps 1225-1245). In step 1225, the external device 115 receives an indication of a desired brightness through the use of the indicator 1165*c* and the slider 1165*b*. In other embodiments, the brightness/runtime control 1165 may include other implementations aside from the slider. The external device 115 then determines a current state of charge of the battery pack(s) of the light device 105 (step 1230). Based on the current state of charge of the battery pack(s), the external device 115 calculates an approximate runtime at the desired brightness (step 1235). In some embodiments, to calculate the approximate runtime at the desired brightness, the external device 115 may access historical usage information for the light device 105 to approximate the power consumption of the light device 105 at the selected brightness. The external device 115 also displays the approximate runtime to inform the user of how the selected brightness affects the operation of the light device 105. Then, the external device 115 sends a command to the light device 105 to operate at the desired brightness (step 1245). The light device 105 continues to operate according to the commands from the external device 115, and the method proceeds to step 1275.

Otherwise, when the selected controlled parameter is runtime, the external device 115 proceeds to operate the light device 105 at an approximate brightness for approximately the desired runtime (steps 1250-1270). In step 1250, the external device 115 receives an indication of a desired approximate runtime through the use of the indicator 1165*b* and the slider 1165*b*. As discussed above, the brightness/runtime control 1165 may have a different selection mechanism. The external device 1115 then determines a current state of charge of the battery pack(s) of the light device 105 (step 1255). Based on the current state of charge of the battery pack(s), the external device 115 calculates an approximate maximum brightness for the desired runtime (step 1260). As discussed above, the light device 105 may access historical usage information to approximate the power consumption of the light device at different brightness levels. The external device 115 also displays the approximate maximum brightness (step 1265) to indicate to the user the approximate brightness if the light device 105 is to be operated for the desired runtime. The external device 115 then sends a command to the light device 105 to operate that the approximate maximum brightness (step 1270). The light device 105 continues operating according to the commands from the external device 115. The external device 115 generates an alert for the user regarding an expected deactivation of the light device (step 1275). As shown in FIG. 20B, the user may configure when the alert messages are generated by the external device 115. Therefore, a user may pre-program future operation of a light device 105 through the external device 115.

Figure 22:
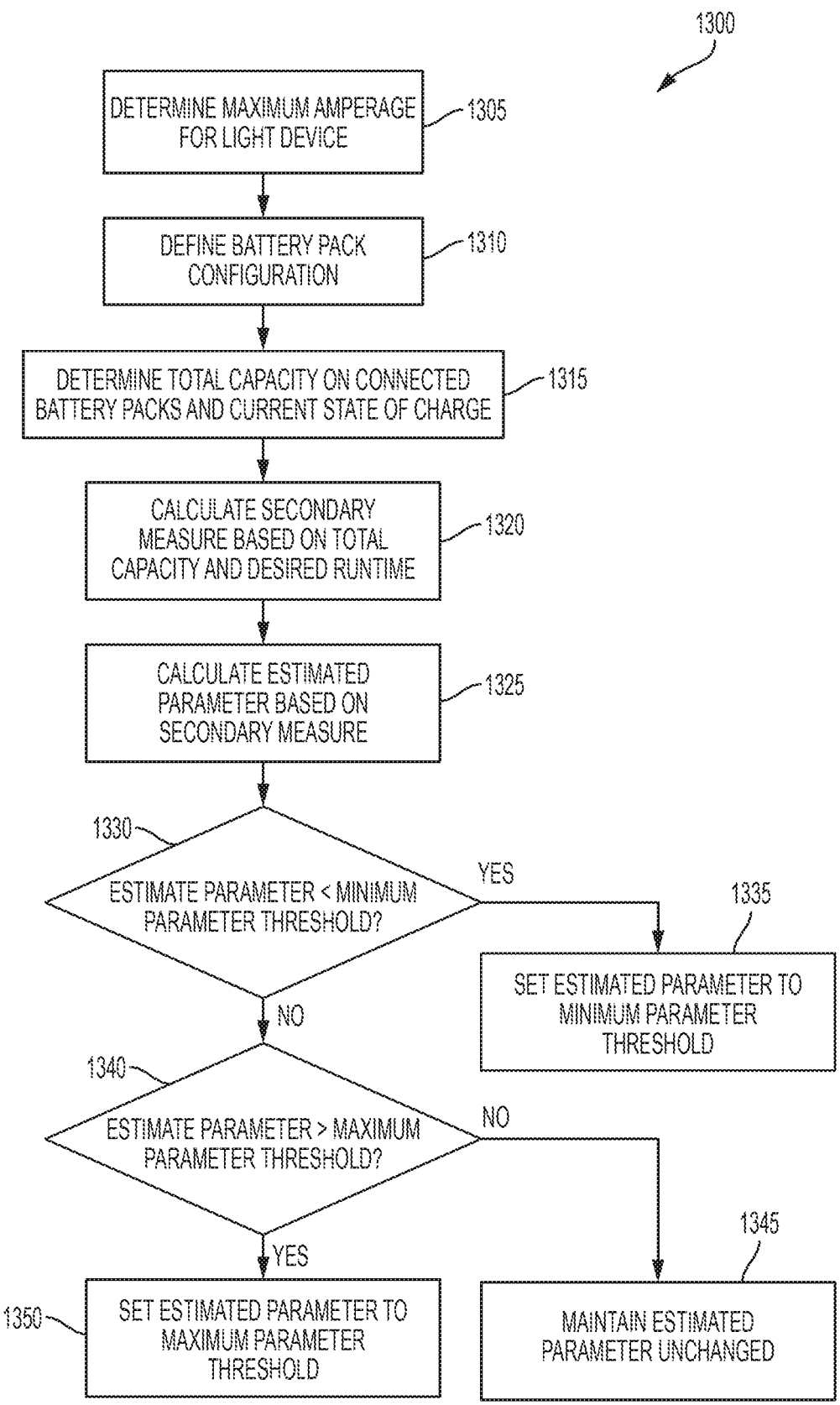
FIG. 22 is a flowchart illustrating a method of calculating brightness or runtime of a light device of the communication system of FIG. 1.

FIG. 22 is a flowchart illustrating a method 1300 of calculating brightness or runtime of a light device as described in steps 1235 and 1260 of FIG. 21. The method 1300 may be used for calculating either the brightness or the runtime based on the selected controlled parameter. The parameter desired and controlled by the user is referred to in the flowchart and the description below as the "controlled parameter," the parameter estimated is referred to in the flowchart and the description below as the "estimated parameter." For example, when the external device 115 receives an indication from the user regarding a desired runtime and displays the approximate maximum brightness, the desired runtime corresponds to the "controlled parameter" and the approximate maximum brightness corresponds to the "estimated parameter." When the external device 115 receives an indication from the user regarding a desired brightness and displays an estimated runtime, the desired brightness corresponds to the "controlled parameter," and the runtime corresponds to the "estimated parameter."

The method 1300 of FIG. 22 begins by determining a maximum amperage for the light device 105 (step 1305). In one embodiment, the electronic processor 525 of the external device 115 determines he maximum amperage for the light device 105 by communicating directly with the light device 105. The light device 105 may send the maximum amperage for the light device 105 as part of its identification signal. In other embodiments, the electronic processor 525 of the external device 115 may access the server 120, which may provide some basic information regarding the light device 105, including its maximum amperage. The electronic processor 525 of the external device 115 may then also determine a battery pack configuration of the light device 105 (step 1310). In some embodiments, the electronic processor 525 of the external device 115 assumes a specific battery pack configuration based on the light device 105 and the standard battery packs compatible with the light device 105. In other embodiments, the external device 115 communicates with the light device 105 to figure out which battery packs are connected to the light device 105 and how they are connected to each other. In yet other embodiments, the external device 115 may receive a user selection of an appropriate battery pack configuration. For example, the external device 115 may display the different type of battery packs that may be compatible with the light device 105 and/or different configuration options. The user then selects the battery packs that are connected to the light device 105 and, in some embodiments, also selects a particular configuration for the battery packs. In one example, the electronic processor 525 of the external device 115 assumes that two 9 Amp-hour battery packs are connected to the light device 105.

The electronic processor 525 of the external device 115 then proceeds to determine the total capacity based on the connected battery packs and the current state of charge of each (step 1315). The electronic processor 525 of the external device 115 determines the state of charge of each of the battery packs connected to the light device 105 through data communication between the external device 115 and the light device 105. The total capacity takes into account the current state of charge of each of the connected battery packs, as well as how many battery packs are connected to the light device 105. The electronic processor 525 of the external device 115 then calculates a secondary measure of the estimated parameter based on the total capacity and the value of the controlled parameter (step 1320). In some embodiments, the secondary measure of the estimated parameter is an indirect measurement of the estimated parameter, and minimal calculations are performed to then determine the estimated parameter. For example, when the controlled parameter includes a desired runtime, the electronic processor 525 of the external device 115 calculates an amperage of the light device 105 based on the total capacity and the desired runtime. On the other hand, when the controlled parameter includes desired brightness, the electronic processor 525 of the external device 115 calculates a runtime in minutes (or a different unit) based on the total capacity and the desired brightness.

The electronic processor 525 of the external device 115 then calculates the estimated parameter based on the secondary measure of the estimated parameter (step 1325). In some embodiments, minimal calculation are performed to transform the number from the secondary measure to the actual estimated parameter. For example, the electronic processor 525 of the external device 115 transforms amperage to brightness by defining a ratio of the estimated amperage to the maximum amperage, and multiplying the ratio by 100 (e.g., to calculate the percent brightness). Analogously, the electronic processor 525 of the external device 115 determines the estimated runtime in hours based on the preliminary runtime, which had been calculated in minutes.

The electronic processor 525 then compares the estimated value with a minimum parameter threshold (step 1330). When the estimated value for the parameter is below the minimum parameter threshold, the electronic processor 525 of the external device 115 changes the estimated parameter to match the minimum parameter threshold (step 1335). For example, when the estimated brightness is below a minimum brightness threshold, the electronic processor 525 sets the estimated brightness to be the minimum brightness threshold. In one example, the minimum brightness threshold may be 10%. In some embodiments, the external device 115 displays an alert message that the current state of charge of the battery pack prevents the light device 105 to be controlled by the desired controlled parameter. For example, the alert may indicate "the desired runtime is too long for the current state of charge of the battery packs. The light device 105 may turn off prematurely even if it operates at the lowest brightness setting." On the other hand, when the estimated value for the parameter is not below the minimum parameter threshold, the electronic processor 525 of the external device 115 continues to step 1340, in which the electronic processor 525 of the external device 115 determines whether the estimated parameter is greater than a maximum parameter threshold. When the electronic processor 525 determines that the estimated parameter is not above the maximum parameter threshold (in other words, the estimated parameter is above the minimum parameter threshold and below the maximum parameter threshold), the electronic processor 525 maintains the current value for the estimated parameter (step 1345). On the other hand, when the electronic processor 525 determines that the estimated parameter is greater than the maximum parameter threshold, the electronic processor 525 updates the estimated parameter to be the maximum parameter threshold (step 1350). For example, when the estimated brightness is greater than the maximum brightness threshold, the electronic processor 525 sets the estimated brightness to the maximum brightness threshold. The maximum brightness threshold may be, for example, 90%. Once the electronic processor 525 determines the estimated parameter, the electronic processor 525 proceeds to displaying the estimated parameters as discussed with respect to steps 1240 and 1265 of FIG. 21. Although the method 1300 of FIG. 21 has been described as being performed by the electronic processor 525 of the external device 115, in some embodiments, the electronic processor of the server 120 performs the method 1300 of FIG. 22 and forwards the estimated parameter to the external device 115 for display.

In some other embodiments, the communication system 100 also includes a gateway. In such embodiments, when a data message is intended for the external device 115, the light devices 105 use the mesh network as described in, for example, FIG. 14, and communicate data messages to each other until one of the light devices 105 is within the direct communication range of the gateway. The gateway then receives the data message and forwards the data message to the external device 115 using, for example, internet protocol, or a similar technology.

Figure 23:
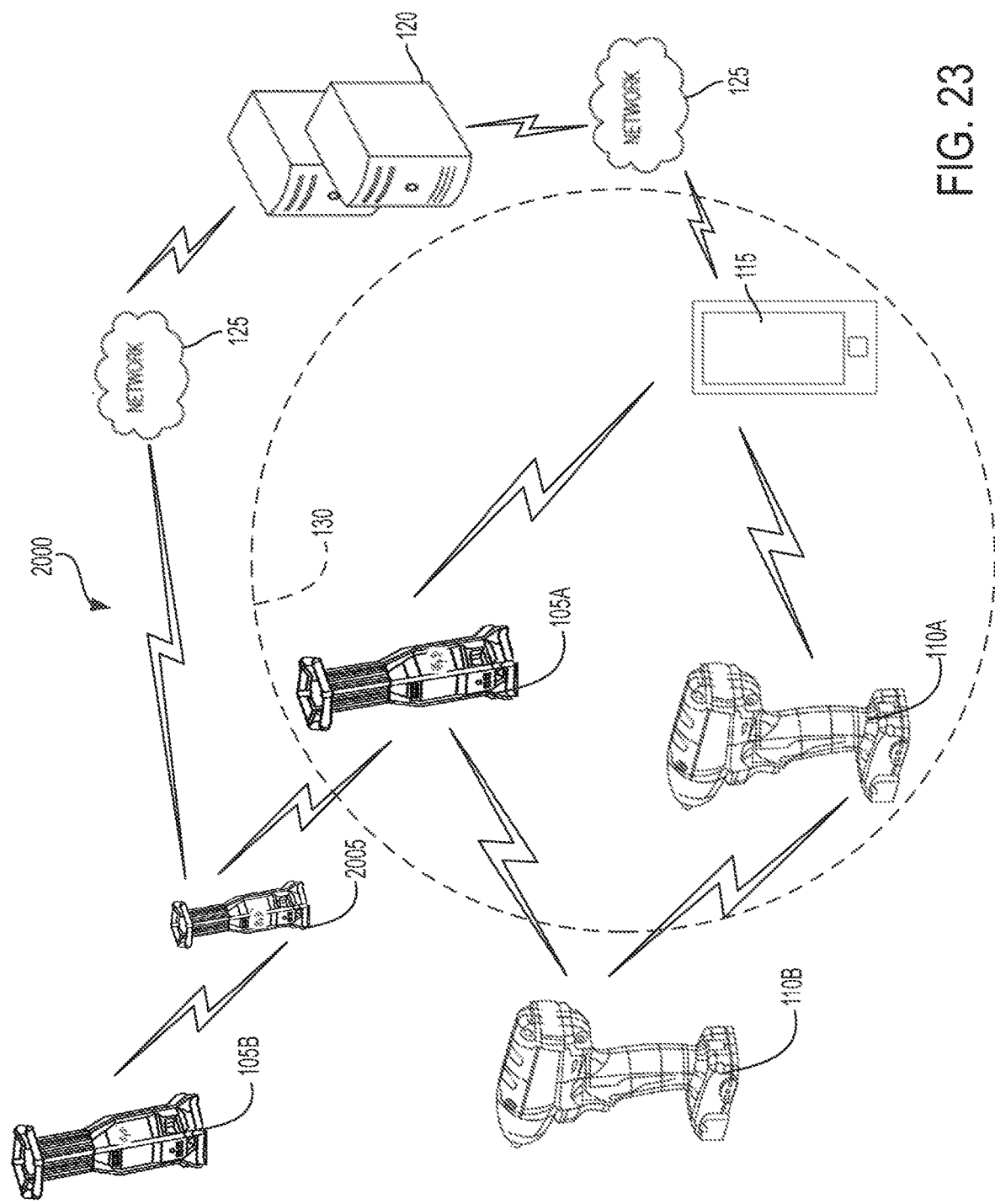
FIG. 23 illustrates a schematic diagram of a communication system according to another embodiment of the invention.

FIG. 23 illustrates an alternative embodiment of the communication system 2000. The communication system 2000 is generally similar to the communication system 100 of FIG. 1, and similar components are given the same reference numbers. The communication system 2000 of FIG. 23 includes power tool devices 110, light devices 105, an external device 115, and a server 120. In addition, the communication system 2000 of FIG. 23 includes master light devices 2005. Master light devices 1305 are similar to the light devices 105 in construction and components, but also include a communication circuit that enables the master light devices 2005 to communicate directly with the server 120. The master light devices 2005 therefore allow updating of, for example, location information on the server 120 without necessarily having the message reach the external device 115. The master light devices 2005 provide a shortcut for messages directed to the external device 115. For example, if a light device outside the direct communication range of the external device 115 sends a message to the external device 115, the wireless message can reach the external device 115 through the master light device 2005. The master light device 2005 receives the wireless message from the light device, sends the wireless message to the server 120, and the server 120 transmits the wireless message directly to the external device 115. The master light devices 2005 may therefore decrease the time required for a wireless message to reach the external device 115. The communication system 2000 of FIG. 23 can perform the same methods described above with respect to FIGS. 6-22.

In some embodiments, all of the light devices 105 include the same hardware and software, and the user may select which light devices 105 behave as master light devices (e.g., activates functionality to communicate directly with the server 120 on some of the light devices 105). Having a mix of master light devices 2005 and light devices 105 enables for lower power consumption of the communication system 2000 overall while at the same time increasing connectivity and speed of communications within the communication system 2000. In other embodiments, however, the master light devices 2005 include an additional components not found in other light devices 105 that allow the master light devices 2005 to communicate with the remote server 120.

Thus, the invention provides, among other things, a network of lights that communicates with an external device to provide remote monitoring and control. Various features and advantages of the invention are set forth in the following claims.

What is claimed is:

1. An external device comprising:
a display;
a device transceiver; and
an electronic processor configured to
display a list of battery-powered self-standing light devices on a first screen of the display, wherein the external device is configured to communicate with each light device included in the list of light devices,
receive, via the display, a selection of a first light device included in the list of light devices,
in response to receiving the selection of the first light device, display a home screen for the first light device on the display, wherein the home screen includes an icon of the first light device and a selectable option,
receive, via the display, a selection of the selectable option,
in response to receiving the selection of the selectable option, display a settings screen on the display, wherein the settings screen includes a plurality of settings configured to be manipulated by a user to control parameters of the first light device,
receive, via the display, a user input that manipulates at least one setting of the plurality of settings, and
in response to receiving the user input that manipulates the at least one setting of the plurality of settings, transmit a command, via the device transceiver, to the first light device to control at least one parameter of the first light device in accordance with the received user input.

2. The external device of claim 1, wherein the at least one setting includes an on/off setting, and wherein the at least one parameter includes whether the first light device is powered on/off.

3. The external device of claim 1, wherein the at least one setting includes a brightness level setting, and wherein the at least one parameter includes a brightness level of the first light device.

4. The external device of claim 1, wherein the at least one setting includes a schedule setting, and wherein the at least one parameter includes controlling operation of the first light device at a future time based on the user input.

5. The external device of claim 4, wherein the schedule setting further includes a brightness level setting, and wherein the at least one parameter further includes controlling a brightness level of the first light device at the future time based on the brightness level setting.

6. The external device of claim 1, wherein the at least one setting includes an economy setting, and wherein the at least one parameter includes reducing a power consumption of the first light device.

7. The external device of claim 1, wherein the first screen includes the icon of the first light device adjacent to a name of the first light device that is included in the list of light devices.

8. The external device of claim 1, wherein the electronic processor is configured to:

receive, via the device transceiver, usage information of the first light device from the first light device; and display the usage information of the first light device on the display.

9. The external device of claim 1, wherein the electronic processor is configured to:

receive, via the display, a second user input configured to manipulate an on/off setting for a plurality of light devices;

in response to receiving the second user input, transmit a second command, via the device transceiver, to the plurality of light devices to control the plurality of light devices to be on/off in accordance with the received second user input.

10. A method of controlling a light device, the method comprising:

displaying a list of battery-powered self-standing light devices on a first screen of a display of an external device, wherein the external device is configured to communicate, with a device transceiver of the external device, with each light device included in the list of light devices;

receiving, via the display and with an electronic processor of the external device, a selection of a first light device included in the list of light devices;

in response to receiving the selection of the first light device, displaying a home screen for the first light device on the display, wherein the home screen includes an icon of the first light device and a selectable option;

receiving, via the display and with the electronic processor, a selection of the selectable option;

in response to receiving the selection of the selectable option, displaying a settings screen on the display, wherein the settings screen includes a plurality of settings configured to be manipulated by a user to control parameters of the first light device;

receiving, via the display and with the electronic processor, a user input that manipulates at least one setting of the plurality of settings; and in response to receiving the user input that manipulates the at least one setting of the plurality of settings, transmitting a command, via the device transceiver, to the first light device to control at least one parameter of the first light device in accordance with the received user input.

11. The method of claim 10, wherein the at least one setting includes an on/off setting, and wherein the at least one parameter includes whether the first light device is powered on/off.

12. The method of claim 10, wherein the at least one setting includes a brightness level setting, and wherein the at least one parameter includes a brightness level of the first light device.

13. The method of claim 10, wherein the at least one setting includes a schedule setting, and wherein the at least one parameter includes controlling operation of the first light device at a future time based on the user input.

14. The method of claim 13, wherein the schedule setting further includes a brightness level setting, and wherein the at least one parameter further includes controlling a brightness level of the first light device at the future time based on the brightness level setting.

15. The method of claim 10, wherein the at least one setting includes an economy setting, and wherein the at least one parameter includes reducing a power consumption of the first light device.

16. The method of claim 10, wherein the first screen includes the icon of the first light device adjacent to a name of the first light device that is included in the list of light devices.

17. The method of claim 10, further comprising:

receiving, via the device transceiver, usage information of the first light device from the first light device; and displaying the usage information of the first light device on the display.

18. The method of claim 10, further comprising:

receiving, via the display and with the electronic processor, a second user input configured to manipulate an on/off setting for a plurality of light devices;

in response to receiving the second user input, transmitting a second command, via the device transceiver, to the plurality of light devices to control the plurality of light devices to be on/off in accordance with the received second user input.

19. A light device control system comprising:

an external device including
a display,
an external device transceiver, and
an external device electronic processor configured to
display a list of battery-powered self-standing light devices on a first screen of the display, wherein the external device is configured to communicate with each light device included in the list of light devices, receive, via the display, a selection of a first light device included in the list of light devices, in response to receiving the selection of the first light device, display a home screen for the first light device on the display, wherein the home screen includes an icon of the first light device and a selectable option, receive, via the display, a selection of the selectable option, in response to receiving the selection of the selectable option, display a settings screen on the display, wherein the settings screen includes a plurality of settings configured to be manipulated by a user to control parameters of the first light device, receive, via the display, a user input that manipulates at least one setting of the plurality of settings, and in response to receiving the user input that manipulates the at least one setting of the plurality of settings, transmit a command, via the external device transceiver, to the first light device based on the received user input; and the first light device including
a housing,
a first light supported by the housing,
a light device transceiver supported by the housing, and
a light device electronic processor coupled to the first light and the light device transceiver, wherein the light device electronic processor is configured to
receive the command via the light device transceiver, and
control at least one parameter of the first light in accordance with the command.

20. The system of claim 19, wherein the external device electronic processor is configured to:

receive, via the external device transceiver, usage information of the first light device from the first light device; and display the usage information of the first light device on the display.

* * * * *